US011671149B2

(12) United States Patent
Chen et al.

(10) Patent No.: US 11,671,149 B2
(45) Date of Patent: Jun. 6, 2023

(54) BEAM MANAGEMENT FOR MULTI-TRP

(71) Applicant: INTERDIGITAL PATENT HOLDINGS, INC., Wilmington, DE (US)

(72) Inventors: Wei Chen, San Diego, CA (US); Fengjun Xi, San Diego, CA (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/268,004

(22) PCT Filed: Aug. 16, 2019

(86) PCT No.: PCT/US2019/046826
§ 371 (c)(1),
(2) Date: Feb. 11, 2021

(87) PCT Pub. No.: WO2020/037207
PCT Pub. Date: Feb. 20, 2020

(65) Prior Publication Data
US 2021/0167821 A1    Jun. 3, 2021

Related U.S. Application Data

(60) Provisional application No. 62/765,091, filed on Aug. 17, 2018.

(51) Int. Cl.
*H04B 7/0408* (2017.01)
*H04B 7/0404* (2017.01)
(Continued)

(52) U.S. Cl.
CPC ......... *H04B 7/0408* (2013.01); *H04B 7/0404* (2013.01); *H04B 7/0617* (2013.01); *H04W 88/02* (2013.01)

(58) Field of Classification Search
CPC .. H04B 7/0408; H04B 7/0404; H04B 7/0617; H04W 88/02
See application file for complete search history.

(56) References Cited

U.S. PATENT DOCUMENTS 9,219,541 B2    12/2015    Rubin et al.
9,397,738 B2    7/2016    Xu et al.
(Continued)

FOREIGN PATENT DOCUMENTS

AU    2018244982 A1 *    8/2019    ........... H04B 7/0404
CA    3052397 A1 *    10/2018    ........... H04B 7/0404
(Continued)

OTHER PUBLICATIONS

E. Onggosanusi et al., "Modular and High-Resolution Channel State Information and Beam Management for 5G New Radio," in IEEE Communications Magazine, vol. 56, No. 3, pp. 48-55, Mar. 2018, doi: 10.1109/MCOM.2018.1700761. (Year: 2018).*
(Continued)

*Primary Examiner* — Berhanu Tadese
(74) *Attorney, Agent, or Firm* — Volpe Koenig

(57) ABSTRACT

Methods and apparatus for beam management are disclosed. A WTRU may include a plurality of antenna panels, each antenna panel comprising a plurality of antennas configured to transmit on directional transmit (TX) beams. The WTRU may send, to a transmission reception point (TRP), antenna panel capability information for the plurality of antenna panels and receive a reference signal (RS) configuration for configuring RS resource sets. The WTRU may send an RS transmission trigger frame identifying triggered RS resource sets from the configured RS resource sets. The WTRU may identify a set of antenna panels to be used with the triggered RS resource sets. The WTRU may determine an UL TX beam sweeping mode and an association between the triggered RS resources sets and the set of antenna panels. The
(Continued)

WTRU may perform UL beam sweeping using the triggered RS resource sets and associated set of antenna panels.

17 Claims, 17 Drawing Sheets

(51) Int. Cl.
H04B 7/06 (2006.01)
H04W 88/02 (2009.01)

(56) References Cited

U.S. PATENT DOCUMENTS

| | | | | |
|---|---|---|---|---|
| 9,817,110 | B2 * | 11/2017 | Koerber | G01S 7/032 |
| 10,028,153 | B2 * | 7/2018 | Hui | H04B 7/0617 |
| 10,674,351 | B2 * | 6/2020 | Sundararajan | H04B 7/0404 |
| 10,852,407 | B2 * | 12/2020 | Koerber | G01S 7/032 |
| 10,972,166 | B2 * | 4/2021 | Liu | H04B 7/0404 |
| 10,999,745 | B2 * | 5/2021 | Yang | H04L 27/2607 |
| 11,101,951 | B2 * | 8/2021 | Park | H04B 7/0695 |
| 11,258,499 | B2 * | 2/2022 | Park | H04B 7/0695 |
| 11,265,050 | B2 * | 3/2022 | Park | H04L 27/2626 |
| 11,284,246 | B2 * | 3/2022 | Huang | H04B 7/063 |
| 11,336,354 | B2 * | 5/2022 | Park | H04L 1/0016 |
| 11,533,762 | B2 * | 12/2022 | Kang | H04W 74/0833 |
| 2017/0207843 | A1 * | 7/2017 | Jung | H04B 7/063 |
| 2018/0206132 | A1 * | 7/2018 | Guo | H04W 72/0473 |
| 2018/0332625 | A1 * | 11/2018 | Tsai | H04B 7/0408 |
| 2019/0109732 | A1 * | 4/2019 | Choi | H04L 1/00 |
| 2019/0190669 | A1 * | 6/2019 | Park | H04L 5/0023 |
| 2019/0222279 | A1 * | 7/2019 | Xi | H04B 7/0695 |
| 2019/0363911 | A1 * | 11/2019 | Choi | H04L 25/0226 |
| 2020/0036493 | A1 * | 1/2020 | Choi | H04W 72/23 |
| 2020/0092055 | A1 * | 3/2020 | Choi | H04L 27/2613 |
| 2020/0100232 | A1 * | 3/2020 | Onggosanusi | H04L 5/0094 |
| 2020/0106168 | A1 * | 4/2020 | Hakola | H01Q 1/246 |
| 2020/0112355 | A1 * | 4/2020 | Park | H04B 7/0626 |
| 2020/0136708 | A1 * | 4/2020 | Pan | H04B 7/0408 |
| 2020/0145866 | A1 * | 5/2020 | Onggosanusi | H04L 5/0048 |
| 2020/0163079 | A1 * | 5/2020 | Choi | H04L 5/0087 |
| 2020/0204313 | A1 * | 6/2020 | Choi | H04L 5/0094 |
| 2020/0228267 | A1 * | 7/2020 | Park | H04B 7/0639 |
| 2020/0252838 | A1 * | 8/2020 | Akdeniz | H04W 36/0085 |
| 2020/0295973 | A1 * | 9/2020 | Choi | H04L 27/26132 |
| 2020/0344819 | A1 * | 10/2020 | Myung | H04W 72/0453 |
| 2021/0022026 | A1 * | 1/2021 | Onggosanusi | H04B 7/0617 |
| 2021/0028839 | A1 * | 1/2021 | Oteri | H04B 7/0617 |
| 2021/0044343 | A1 * | 2/2021 | Onggosanusi | H04B 7/0695 |
| 2021/0058209 | A1 * | 2/2021 | Qin | H04L 5/0048 |
| 2021/0067979 | A1 * | 3/2021 | Rahman | H04L 5/0098 |
| 2021/0075490 | A1 * | 3/2021 | Yang | H04W 24/10 |
| 2021/0083825 | A1 * | 3/2021 | Choi | H04L 5/0051 |
| 2021/0143957 | A1 * | 5/2021 | Gao | H04B 7/0874 |
| 2021/0153215 | A1 * | 5/2021 | Guan | H04L 67/34 |
| 2021/0167821 | A1 * | 6/2021 | Chen | H04B 7/0408 |
| 2021/0168714 | A1 * | 6/2021 | Guan | H04W 52/16 |
| 2021/0176780 | A1 * | 6/2021 | Kang | H04W 74/004 |
| 2021/0226682 | A1 * | 7/2021 | Park | H04L 5/005 |
| 2021/0226689 | A1 * | 7/2021 | Farag | H04B 7/0617 |
| 2021/0234579 | A1 * | 7/2021 | Han | H04L 5/0053 |
| 2021/0282180 | A1 * | 9/2021 | Kang | H04B 7/0404 |
| 2022/0095382 | A1 * | 3/2022 | Tsai | H04W 56/001 |

FOREIGN PATENT DOCUMENTS

| | | | | |
|---|---|---|---|---|
| CN | 110268667 | A * | 9/2019 | H04B 7/0617 |
| CN | 110463066 | A * | 11/2019 | H04B 7/0404 |
| CN | 109600208 | B * | 6/2021 | H04B 7/0456 |
| CN | 113507746 | A * | 10/2021 | H04B 7/0617 |
| CN | 113708815 | A * | 11/2021 | H04B 7/04 |
| CN | 110268667 | B * | 5/2022 | H04B 7/0617 |
| CN | 110463066 | B * | 6/2022 | H04B 7/0404 |
| EP | 3837774 | A1 * | 6/2021 | H04B 7/0404 |
| JP | 7023970 | B2 * | 2/2022 | H04B 7/0404 |
| RU | 2720462 | C1 * | 4/2020 | H04B 7/0404 |
| WO | WO-9744982 | A2 * | 11/1997 | H04W 16/28 |
| WO | WO-2015086079 | A1 * | 6/2015 | H04B 7/0408 |
| WO | WO-2016071840 | A1 * | 5/2016 | H04B 7/0617 |
| WO | 2017/080132 | | 5/2017 | |
| WO | 2018/031807 | | 2/2018 | |
| WO | WO-2018062937 | A1 * | 4/2018 | H04B 7/024 |
| WO | WO-2018143721 | A1 * | 8/2018 | H04B 7/0617 |
| WO | WO-2018175714 | A1 * | 9/2018 | H04B 7/0617 |
| WO | WO-2018230967 | A1 * | 12/2018 | H04B 7/0469 |
| WO | WO-2018232090 | A1 * | 12/2018 | H04B 7/0626 |
| WO | WO-2020037207 | A1 * | 2/2020 | H04B 7/0404 |

OTHER PUBLICATIONS

3GPP Non-codebook based UL MIMO R1-1721037 (Year: 2017).*
Onggosanusi et al, Modular and High-Resolution CSI & Beam Management for 5G NR, IEEE, Mar. 2018 (Year: 2018).*
R1-1709735 WF on uplink multi-panel and multi-TRP operation r2 (Year: 2017).*
3GPP Non-codebook based UL Mimo R1-1721037, Dec. 2017 (Year: 2017).*
LG Electronics, Discussion on UL beam management, 3GPP TSG RAN WG1 Meeting #90, R1-1713150, Aug. 2017 (Year: 2017).*
R1-1709735 Way Forward (WF) on uplink multi-panel and multi-TRP operation, May 2017 (Year: 2017).*
Alkhateeb et al., "MIMO Precoding and Combining Solution for Millimeter-Wave-Systems," IEEE Communications Magazine, pp. 122-131 (Dec. 2014).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Intedigital Inc., "Discussion on Multi-Beam Operation Enhancements," 3GPP TSG RAN WG1 Meeting #94bis, R1-1811223, Chengdu, China (Oct. 8-12, 2018).
Intedigital Inc., On Multi-Beam Operation Enhancement, 3GPP TSG RAN WG1 Meeting AH 1901, R1-1900809, Taipei, Taiwan (Jan. 21-25, 2019).
Intedigital Inc., "On Multi-Beam Operation Enhancements," 3GPP TSG RAN WG1 Meeting #95, R1-1813240, Spokane, USA (Nov. 12-16, 2018).
NTT Docomo, Inc., "Presentation of Specification/Report to TSG: TR 38.802, Version 2.0.0," 3GPP TSG-RAN Meeting #75, RP-170377, Dubrovnik, Croatia (Mar. 6-9, 2017).
Third Generation Partnership Project, "Technical Specification Group Radio Access Network; NR; Multiplexing and channel coding (Release 15)," 3GPP TS 38.212 V15.6.0 (Jun. 2019).

(56) References Cited

OTHER PUBLICATIONS

Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 15)," 3GPP TR 38.913 V15.0.0 (Jun. 2018).
Third Generation Partnership Project, "Technical Specification Group Radio Access Network; Study on New Radio Access Technology Physical Layer Aspects (Release 14)," 3GPP TR 38.802 V14.2.0 (Sep. 2017).
Samsung, "WI Proposal on NR MIMO Enhancements," 3GPP TSG RAN Meeting #80, RP-181453, La Jolla, USA (Jun. 11-14, 2018).

\* cited by examiner

BEAM MANAGEMENT FOR MULTI-TRP

CROSS-REFERENCE TO RELATED APPLICATIONS

This application is the U.S. National Stage, under 35 U.S.C. § 371, of International Application No. PCT/US2019/046826 filed Aug. 16, 2019, which claims the benefit of U.S. Provisional Application No. 62/765,091 filed Aug. 17, 2018, the contents of which are incorporated herein by reference.

BACKGROUND

Third Generation Partnership Project (3GPP) standards discussions define several deployment scenarios such as indoor hotspot, dense urban, rural, urban macro, and high speed. Based on general requirements set out by International Telecommunication Union Radio communication Sector (ITU-R), Next Generation Mobile Networks (NGMN) and 3GPP, a broad classification of the use cases for emerging Fifth Generation (5G) New Radio (NR) systems may be classified as enhanced mobile broadband (eMBB), massive machine type communications (mMTC) and ultra-reliable and low latency communications (URLLC). These use cases focus on meeting different performance requirements such as higher data rate, higher spectrum efficiency, low power and higher energy efficiency, and/or lower latency and higher reliability. A wide range of spectrum bands, for example in the range of 700 MHz to 80 GHz, are being considered for a variety of deployment scenarios, that include licensed and unlicensed spectrum.

SUMMARY

Methods and apparatus for a multi-panel wireless transmit and/or receive unit (WTRU) to perform uplink (UL) beam sweeping for uplink (UL) beam management are disclosed. The WTRU may include a plurality of antenna panels, each antenna panel comprising a respective plurality of antennas and configured to transmit on a respective plurality of directional transmit (TX) beams. The WTRU may send, to a transmission reception point (TRP), antenna panel capability information for the plurality of antenna panels and receive a reference signal (RS) configuration for configuring RS resource sets. The WTRU may send an RS transmission trigger frame identifying triggered RS resource sets from the configured RS resource sets. The WTRU may identify a set of antenna panels from the plurality of antenna panels to be used with the triggered RS resource sets based on at least one of the RS configuration or the RS transmission trigger frame. The WTRU may determine an UL TX beam sweeping mode based on the triggered RS resources sets and the set of antenna panels and an association between the triggered RS resources sets and the set of antenna panels. The WTRU may perform UL beam sweeping using the triggered RS resource sets and the set of antenna panels according to the association between the triggered RS resources sets and the set of antenna panels.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 14A shows a network diagram of an example network configuration where multiple DL TX beams at TRPs correspond to different DL RX beams at the WTRU.

DETAILED DESCRIPTION

Figure 1A:
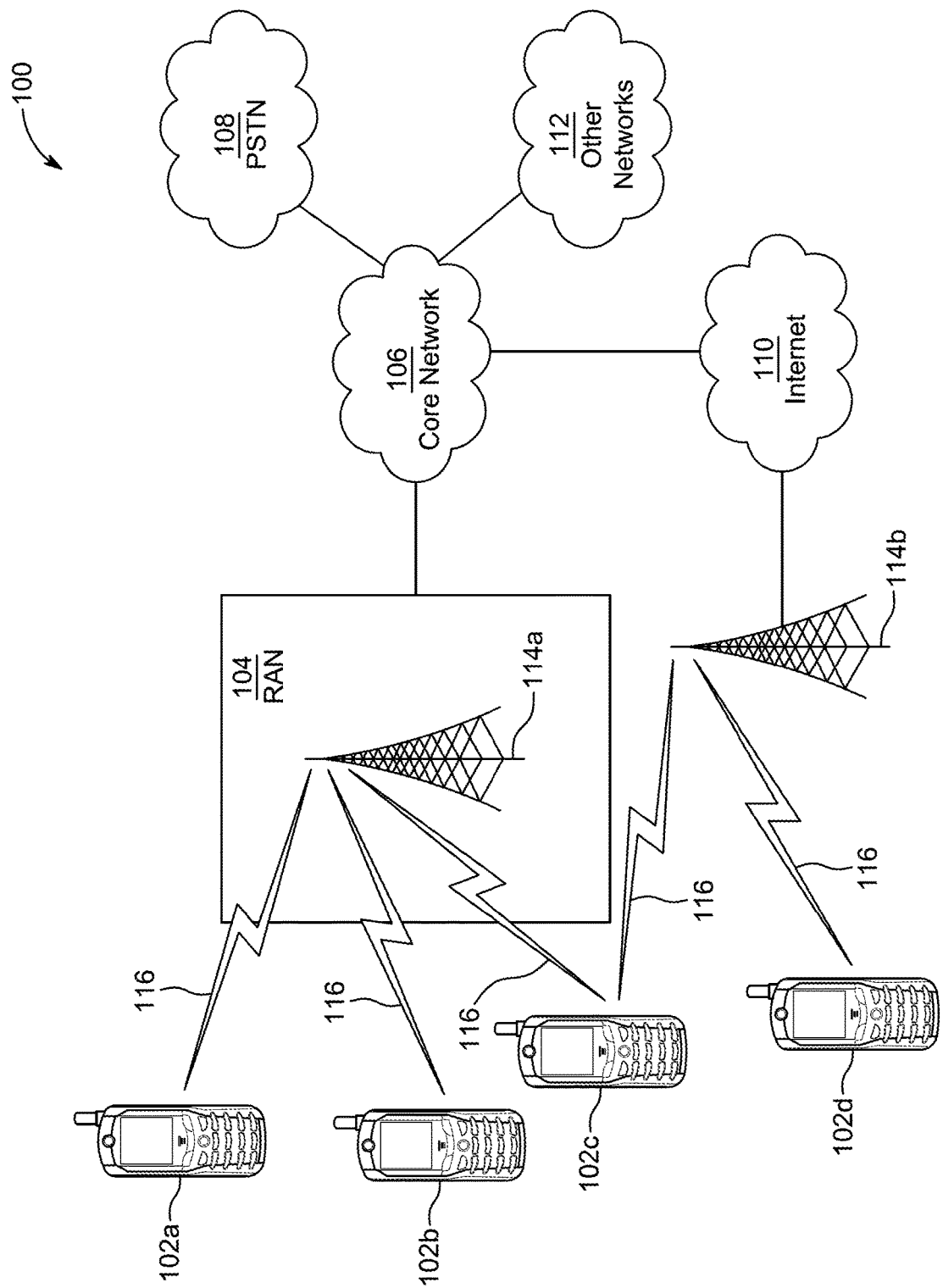
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit and/or receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
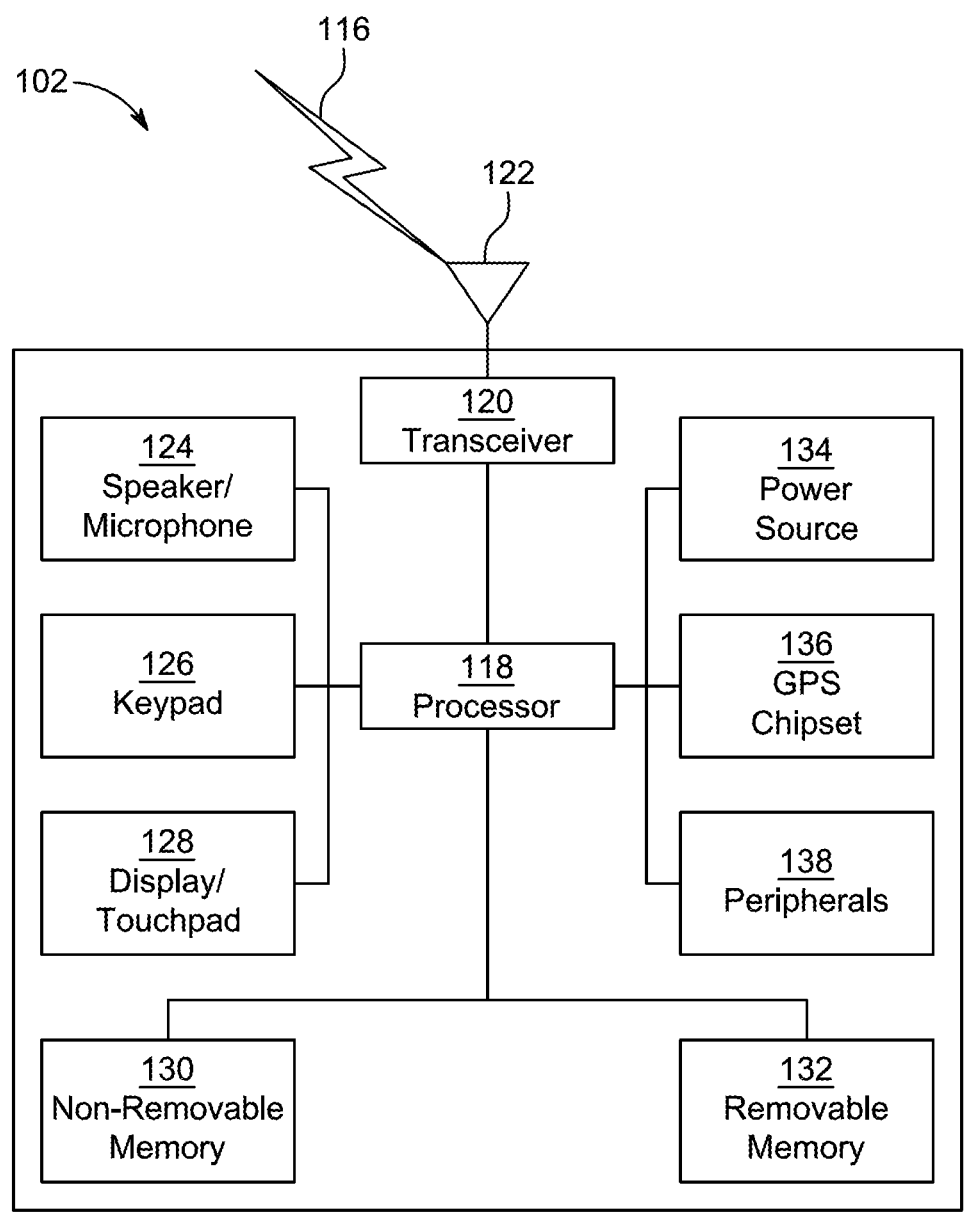
FIG. 1B is a system diagram illustrating an example wireless transmit and/or receive unit (WTRU) that may be used within the communications system illustrated in FIG. 1A according to an embodiment.
Figure 1C:
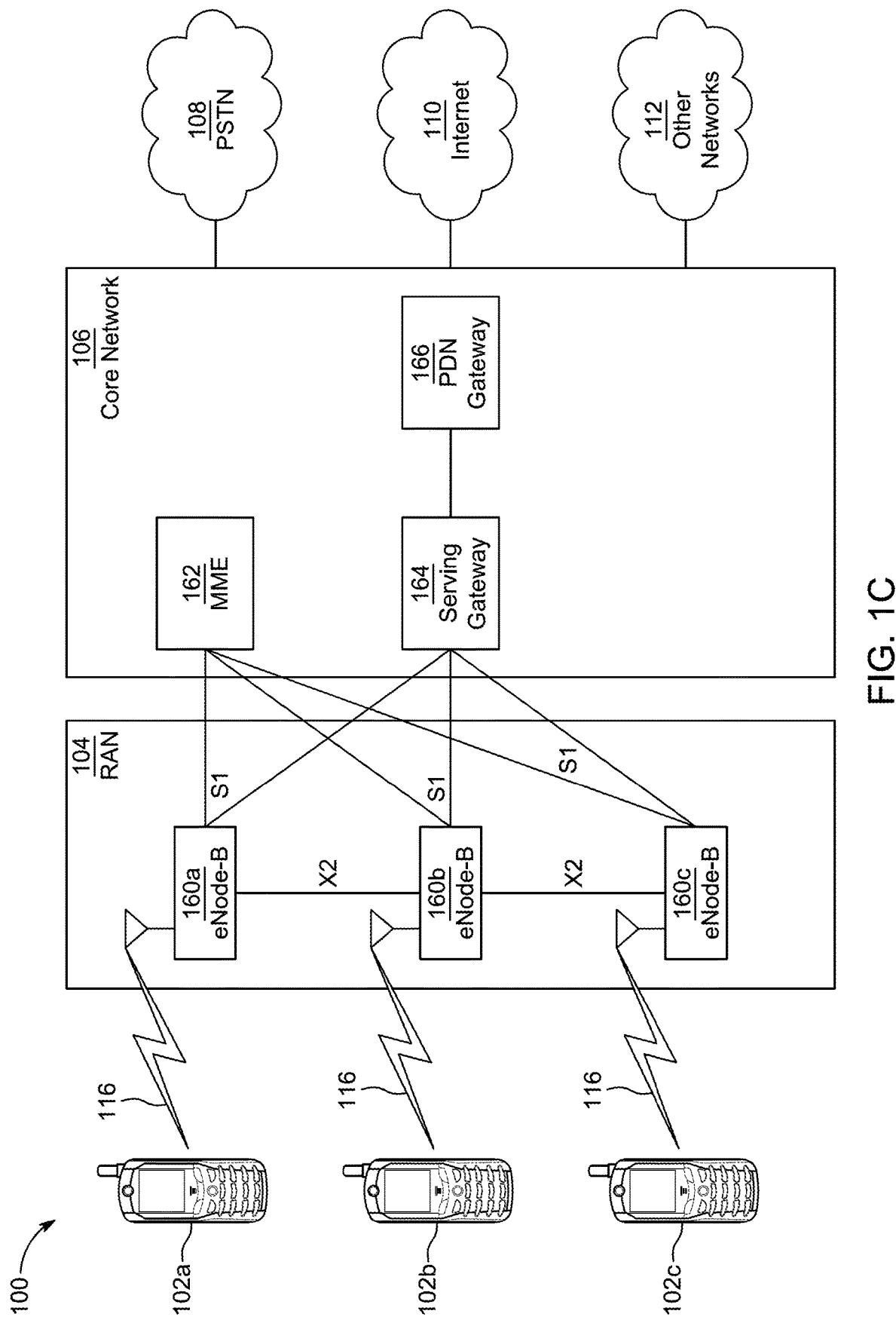
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit and/or receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit and/or receive element 122. While FIG. 1B depicts the processor 118 and the transceiver 120 as separate components, it will be appreciated that the processor 118 and the transceiver 120 may be integrated together in an electronic package or chip.

The transmit and/or receive element 122 may be configured to transmit signals to, or receive signals from, a base station (e.g., the base station 114a) over the air interface 116. For example, in one embodiment, the transmit and/or receive element 122 may be an antenna configured to transmit and/or receive RF signals. In an embodiment, the transmit and/or receive element 122 may be an emitter/detector configured to transmit and/or receive IR, UV, or visible light signals, for example. In yet another embodiment, the transmit and/or receive element 122 may be configured to transmit and/or receive both RF and light signals. It will be appreciated that the transmit and/or receive element 122 may be configured to transmit and/or receive any combination of wireless signals.

Although the transmit and/or receive element 122 is depicted in FIG. 1B as a single element, the WTRU 102 may include any number of transmit and/or receive elements 122. More specifically, the WTRU 102 may employ MIMO technology. Thus, in one embodiment, the WTRU 102 may include two or more transmit and/or receive elements 122 (e.g., multiple antennas) for transmitting and receiving wireless signals over the air interface 116.

The transceiver 120 may be configured to modulate the signals that are to be transmitted by the transmit and/or receive element 122 and to demodulate the signals that are received by the transmit and/or receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
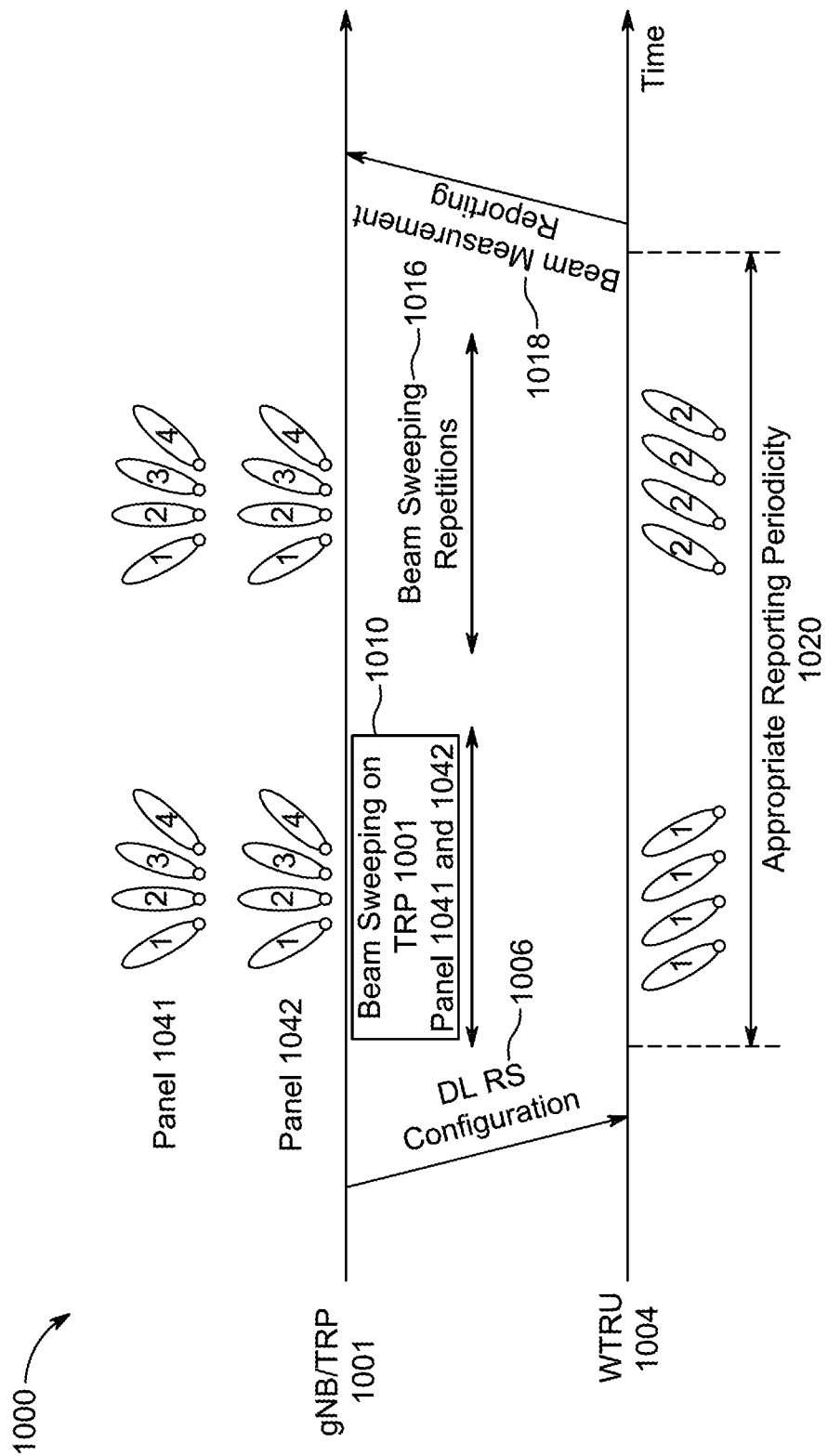
FIG. 10 shows a signaling diagram of an example beam sweeping procedure including configuration of reporting periodicity to reduce latency of beam training.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
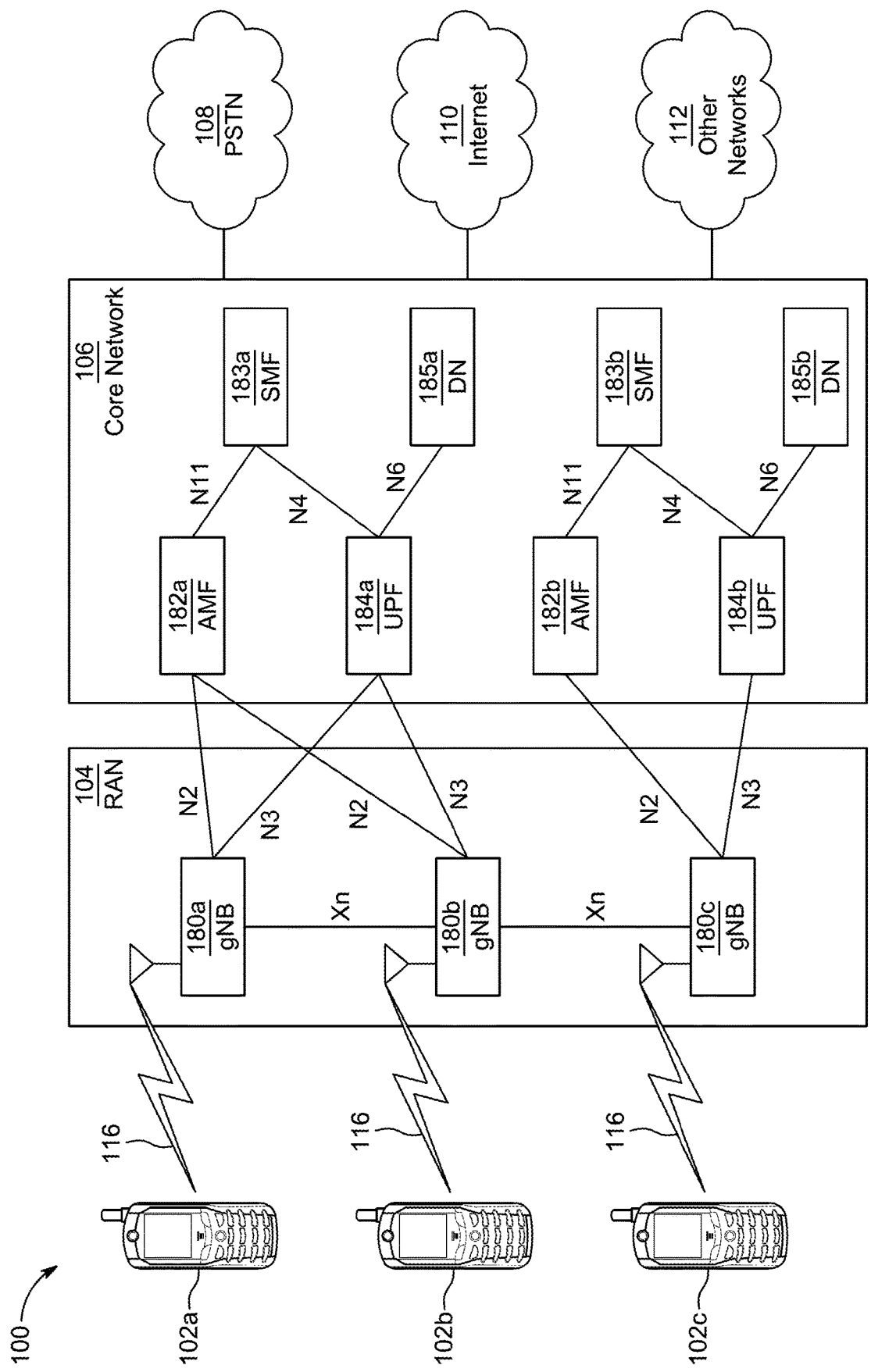
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multiple antenna techniques such as MIMO, and variations of MIMO including Single Input Multiple Output (SIMO) and Multiple Input Single Output (MISO) techniques, have contributed significantly to the advancement of telecommunications. MIMO techniques deliver benefits such as providing diversity gain, multiplexing gain, beamforming, and/or array gain. In the cellular communication paradigm, where all WTRUs may communicate with a single central node, the use of MU-MIMO may increase the system throughput by facilitating the transmission (and/or reception) of multiple data streams to different WTRUs at the same time on the same and/or overlapping set of resources in time and/or frequency. In the SU-MIMO case, the central node may transmit (and/or receive) multiple data streams to multiple WTRUs, and in the MU-MIMO case the central node may transmit (and/or receive) multiple data streams to multiple WTRUs.

Multiple antenna transmission at millimeter wave frequencies may differ slightly from sub-6 GHz multiple antenna techniques. This is due to the different propagation characteristics at millimeter wave frequencies and the possibility of the gNB/WTRU having a limited number of radio frequency (RF) chains compared with antenna elements.

Figure 2:
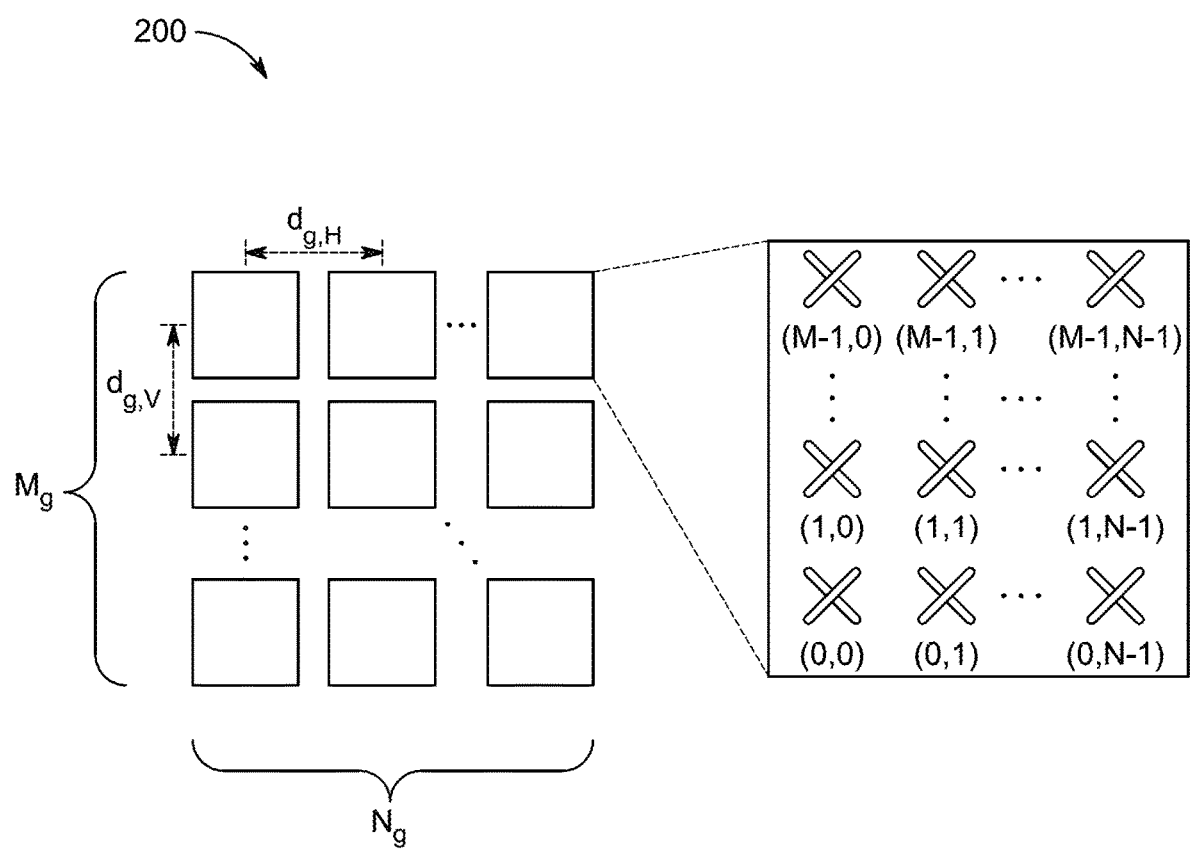
FIG. 2 shows a diagram of an example massive antenna model for a WTRU (or gNB)

FIG. 2 shows a diagram of an example massive antenna model 200 for a WTRU (or gNB). The example massive antenna model 200 may be configured with $M_g$ antenna panels per vertical dimension and $N_g$ antenna panels per horizontal dimension, where each antenna panel may be configured with N columns and M rows of antenna elements with or without polarization. P may be the number of polarizations used, $d_{g,V}$ may be the vertical spacing between antenna panels, $d_{g,H}$ may be the horizontal spacing between antenna panels, $d_V$ may be the vertical spacing between antennas, $d_H$ may be the horizontal spacing between antennas, and λ may be the wavelength of the interfered with frequency band. The timing and phase may or may not be calibrated across panels although multiple panels may be equipped in the same eNB. In an example, the baseline massive antenna configuration may be different according to the operating frequency band, as listed in Table 1.

TABLE 1

Example baseline massive antenna configuration for dense urban and urban macro scenarios

| At 4 GHz | At 30 GHz | At 70 GHz |
|---|---|---|
| Dense urban and urban macro: <br> $(M, N, P, M_g, N_g)$ = (8, 8, 2, 1, 1) <br> $(d_V, d_H)$ = (0.8, 0.5)λ <br><br> A single panel <br> 64 elements per Polarization <br> Total 128 elements | Dense urban and urban macro: <br> $(M, N, P, M_g, N_g)$ = (4, 8, 2, 2, 2) <br> $(d_V, d_H)$ = (0.5, 0.5)λ <br> $(d_{g,V}, d_{g,H})$ = (2.0, 4.0)λ <br> 4 panels <br> 32 elements per Polarization <br> Total 256 elements | Dense urban: <br> Baseline: $(M, N, P, M_g, N_g)$ = (8, 16, 2, 2, 2) <br> $(d_V, d_H)$ = (0.5, 0.5)λ <br> $(d_{g,V}, d_{g,H})$ = (4.0, 8.0) <br> 4 panels <br> 128 elements per Polarization <br> Total 1024 elements |

Precoding at millimeter wave (mmW) frequencies may be digital, analog or a hybrid of digital and analog. Digital precoding is precise and can be combined with equalization. Digital precoding enables single user (SU), multi-user (MU) and multi-cell precoding and is similar to that used in sub 6 GHz, for example in IEEE 802.11n and beyond and in 3GPP LTE and beyond. However, at mmW frequencies, the presence of a limited number of RF chains compared to the number of antenna elements and the sparse nature of the channel may complicate the use of digital beamforming. Analog beamforming may overcome the issues arising from a limited number of RF chains by using analog phase shifters on each antenna element. For example, analog phase shifters may be used in IEEE 802.11ad during the sector level sweep (SLS) p (which identifies the best sector), beam refinement (which refines the sector to an antenna beam) and/or beam tracking (which adjusts the sub-beams over time to take into account any change in the channel). In hybrid beamforming, the precoder may be divided between analog and digital domains. Each of the analog and digital domains may include precoding and combining matrices with different structural constraints (e.g. constant modulus constraint for combining matrices in the analog domain). Using analog and digital domains may result in a compromise between hardware complexity and system performance. Hybrid beamforming may be able to achieve digital precoding performance due to the sparse nature of channel and may support multi-user/multi-stream multiplexing. However, hybrid beamforming may be limited by the number of RF chains, which may not be an issue because mmW channels are sparse in the angular domain.

The use of higher band frequencies (e.g., mmW band, Frequency Range 2 (FR2) that may include frequency bands from 24.25 GHz to 52.6 GHz) may imply that the propagation characteristics of the channel will influence the system design. As frequencies increase, the channel may experience higher path losses and more abrupt changes. In high frequency bands, large-scale antenna arrays may be used to achieve high beamforming gain so as to compensate for the high propagation loss. The resulting coupling loss may be kept at high level to support the desired data throughput or coverage. The use of directional beam based communication may need accurate beam pairing, and the correct beam direction should be associated with the channel, for example in terms of angle of arrival and angle of departure in azimuth and/or elevation. The correct beam direction may be dynamically adjusted with the channel change.

The following example downlink (DL) and uplink (UL) beam management procedures, including P-1, P-2, P-3, U-1, U-2, and U-3 procedures described below, may be considered for NR systems. A P-1 procedure may be used to enable WTRU measurement on different transmission reception point (TRP) transmission (Tx) beams to support selection of TRP Tx beams and WTRU reception (Rx) beam(s). The beamforming procedure at the TRP may include an intra/inter-TRP Tx beam sweep from a set of different beams. The beamforming procedure at a WTRU may include a WTRU Rx beam sweep from a set of different beams. A TRP Tx beam and a WTRU Rx beam may be determined jointly or sequentially. A P-2 procedure may be used to enable WTRU measurement on different TRP Tx beams to possibly change inter/intra-TRP Tx beam(s). For example, the change in inter/intra-TRP Tx beam(s) may be from a different (e.g., smaller) set of beams for beam refinement than in P-1. In an example, the P-2 procedure may be a special case of the P-1 procedure. A P-3 procedure may be used to enable WTRU measurement on the same TRP Tx beam to change the WTRU Rx beam in the case that the WTRU uses beamforming. A U-1 procedure may be used to enable TRP measurement on different WTRU Tx beams to support selection of WTRU Tx beams and/or TRP Rx beam(s). A U-2 procedure may be used to enable TRP measurement on different TRP Rx beams to possibly change/select inter/intra-TRP Rx beam(s). A U-3 procedure may be used to enable TRP measurement on the same TRP Rx beam to change the WTRU Tx beam in the case that the WTRU uses beamforming.

A bandwidth part (BWP) may indicate a contiguous set of physical resource blocks selected from a contiguous subset of the common resource blocks for a given numerology (u) on a given carrier in NR. For example, in the DL, a WTRU may be configured with up to four BWPs, such that one carrier BWP may be active at a given time (i.e., active DL BWP) from a WTRU perspective. The WTRU may not be expected to receive for example physical downlink shared channel (PDSCH), physical downlink control channel (PDCCH), channel state information reference signal (CSI-RS), and/or tracking reference signal (TRS) outside of an active BWP. In the UL, a WTRU may be configured with up to four carrier BWPs, and one carrier BWP may be active at a given time. If a WTRU is configured with a supplementary UL channel, the WTRU may be configured with up to an additional four carrier BWPs in the supplementary UL channel. One carrier BWP may be active at a given time (i.e., active UL BWP) from a WTRU perspective. For example, the WTRU may not transmit physical uplink shared channel (PUSCH) or physical uplink control channel (PUCCH) outside an active BWP.

For each BWP, any one or more of the following parameters may be configured (e.g., sent to the WTRU) for control resource sets (CORESETs) for all types of search space(s) (SS) for DL BWPs in a primary cell (Pcell): BWP indicator field in DCI format 1_1, which may indicate an active DL BWP; BWP indicator field in DCI format 0_1, which may indicate an active UL BWP; for the Pcell, higher layer parameter Default-DL-BWP, which may indicate a default DL BWP among configured DL BWPs (if a WTRU is not provided a default DL BWP parameter via higher layer, the default BWP may be the initial active DL BWP); and/or. A sounding reference signal (SRS) may be transmitted within a BWP even when frequency hopping is activated.

Release 15 (R15) NR MIMO features offer foundation for further potential enhancements in Release 16 (R16) NR. For example, although Type II CSI specified in R15 may offer large gain over advanced CSI Release 14 (R14) LTE, there may be a performance gap from near-ideal CSI, for example in the case of multi-user (MU)-MIMO. R15 NR MIMO may accommodate multi-TRP/panel operation, and may be used for standard-transparent transmission operations and small numbers of TRPs/panels. Although specification support for multi-beam operation has been specified in R15 NR (e.g., targeting over-6 GHz frequency band operation), some aspects such as beam failure recovery and enabling schemes for DL/UL beam selection may be basic and may be improved upon for increased robustness, lower overhead, and/or lower latency. Moreover, there is a need for enhancement to multi-beam operation to allow full power transmission in the case of UL transmission with multiple power amplifiers.

NR MIMO enhancements may be directed to multi-beam operations and may include enhancements to multi-TRP/panel transmission to improve reliability and robustness with ideal and/or non-ideal backhaul. For example, DL control signaling may be specified for efficient support of non-coherent joint transmission. In another example, UL control signaling and/or reference signal(s) may be designed for non-coherent joint transmission. Other enhancements to multi-beam operation, for example targeting frequency range FR2 (24250 MHz-52600 MHz), may include: UL and/or DL transmit beam selection to reduce latency and overhead; UL transmit beam selection for multi-panel operation that facilitates panel-specific beam selection; beam failure recovery for secondary cell (Scell) based on the beam failure recovery; and/or measurement and reporting of either layer 1 reference signal received quality (L1-RSRQ) or layer 1 signal-to-interference-plus-noise ratio (L1-SINR).

For an efficient UL transmit beam selection for multi-panel operation that facilitates panel-specific beam selection, a WTRU may provide information to a gNB to assist UL beam management. Assistant or assistance information may be defined, for example in the case where a multi-panel WTRU may be associated with multiple panels from the same TRP or different TRPs. Based on the WTRU assistance information, efficient SRS configuration may facilitate panel-specific beam measurement and selection. For example, the WTRU assistance information may indicate which SRS resources/sets should be transmitted on which WTRU panel and/or when SRS resources/sets should be transmitted. In another example, the number of resources that should be used for transmission from each WTRU panel at a certain time instance may be determined.

Efficient SRS triggering and transmissions may be supported with reduced latency to solve dynamic beam quality degradation in various cases such as WTRU mobility, rotations and/or beam blockages. A mapping may be defined between one or more triggered SRS resource sets and one or more WTRU panels. The number of SRS resources in each set and the number of SRS resource sets may match the capability of different WTRU panels.

For efficient DL transmit beam selection with reduced latency and overhead, measurement and reporting configuration may consider different DL transmit schemes such as non-coherent joint transmission, coherent joint transmission and/or dynamic point selection (DPS). For example, the configured resource setting may differentiate the beams from different TRPs and different TRP panels with controlled configuration overhead. The measurement and reporting setting may consider beam training latency, resource transmission overhead at the network and measurement overhead at the WTRU in the case of large numbers of beams from multiple TRPs and TRP panels. A WTRU may support differential beam reporting and group based beam reporting more efficiently in the case of multi-TRP/panel.

Mechanisms for low latency and efficient beam management are described herein for different scenarios, such as any of the following example scenarios: UL and DL beam sweeping and/or selection procedures for multi-TRP/panel transmission; DL beam measurement and reporting configuration for multi-TRP/panel transmission; DL beam measurement reporting procedure for multi-TRP/panel transmission; and/or DL and UL beam indication for multi-TRP/panel transmission.

Methods and configurations may be defined for UL beam management for multi-TRP/panel transmission. In the following examples, the reference signal for UL beam management may be SRS, however any other reference signals may be used to replace or complement the use of SRS. UL beam management for multi-TRP/panel transmission may include WTRU capability reporting and/or SRS configuration.

During a WTRU capability reporting procedure, a WTRU with multiple antenna panels may provide assistance information to the network (e.g., gNB/TRP) for panel specific UL beam management. The assistance information may include, but is not limited to include, any of the following example WTRU capability parameters: NumberOfAntennaPanel; maxNumberSimultaneousAntennaPanel-PerCC; AntennaPanelStructure; and/or uplinkBeamManagement. A NumberOfAntennaPanel information element (IE) may refer to a total number of antenna panels physically supported by the WTRU. A maxNumberSimultaneousAntennaPanel-PerCC IE may refer to a number of antenna panels that may be used (e.g., for UL transmission (TX) and/or DL reception (RX)) by the WTRU in one OFDM symbol (simultaneously) per each component carrier (CC). An AntennaPanelStructure IE may refer to whether the WTRU contains only directional antenna panel(s) or a combination of omni-directional antenna panel(s) and directional antenna panels. An AntennaPanelStructure IE may indicate or define whether the WTRU contains homogenous or heterogeneous antenna panels. For example, the AntennaPanelStructure IE may indicate the maximum number of supported UL TX beams by each panel may be the same or different. In another example, the AntennaPanelStructure IE may indicate the maximum number of SRS resources that may be configured for the WTRU per CC or per BWP. An antenna panel may be an antenna group including multiple beams or antenna ports. The antenna panel may be a physical WTRU panel or a WTRU antenna group or antenna port(s) group. Different antenna panels may control its Tx beam, transmission power and/or transmission timing independently. Herein, antenna panel and panel are used interchangeably.

An uplinkBeamManagement IE may define support of beam management for UL. The capability may include indications of any of the following example parameters: maximum directional coverage, where for example each panel that is associated with one or more beams may cover a certain degree of coverage by one or each antenna panel; maximum overlapped directional coverage, where for example adjacent antenna panels may have certain degree of overlapped radio access coverage by two adjacent antenna panels; maximum number of SRS resource sets supported by one or each antenna panel; maximum number of SRS resources per SRS resource set; maximum number of antenna panels that may be utilized simultaneously, which may be for example the number of antenna panels that may perform UL TX beam sweeping simultaneously. The uplinkBeamManagement IE may include a list of antenna panel specific entries, such that each entry may include any of the following example parameters: antenna panel identification defining the differentiation of different antenna panels and entries; directional coverage defining spatial relative directions of this antenna panel; maximum number of SRS resource sets supported by this panel; maximum number of SRS resources per SRS resource set supported by this panel; and/or a maximum number of beams swept by this panel.

In an example, a multi-panel WTRU may be equipped with homogenous antenna panels, where each antenna panel may have similar capabilities for UL TX beam (e.g., the same number of supported beams and/or the same magnitude of directional coverage). An example of SRS configuration (e.g., SRS-Config IE) for a multi-panel WTRU equipped with homogenous antenna is shown in Table 2. The WTRU may be configured with one or multiple SRS resource sets.

Figure 3:
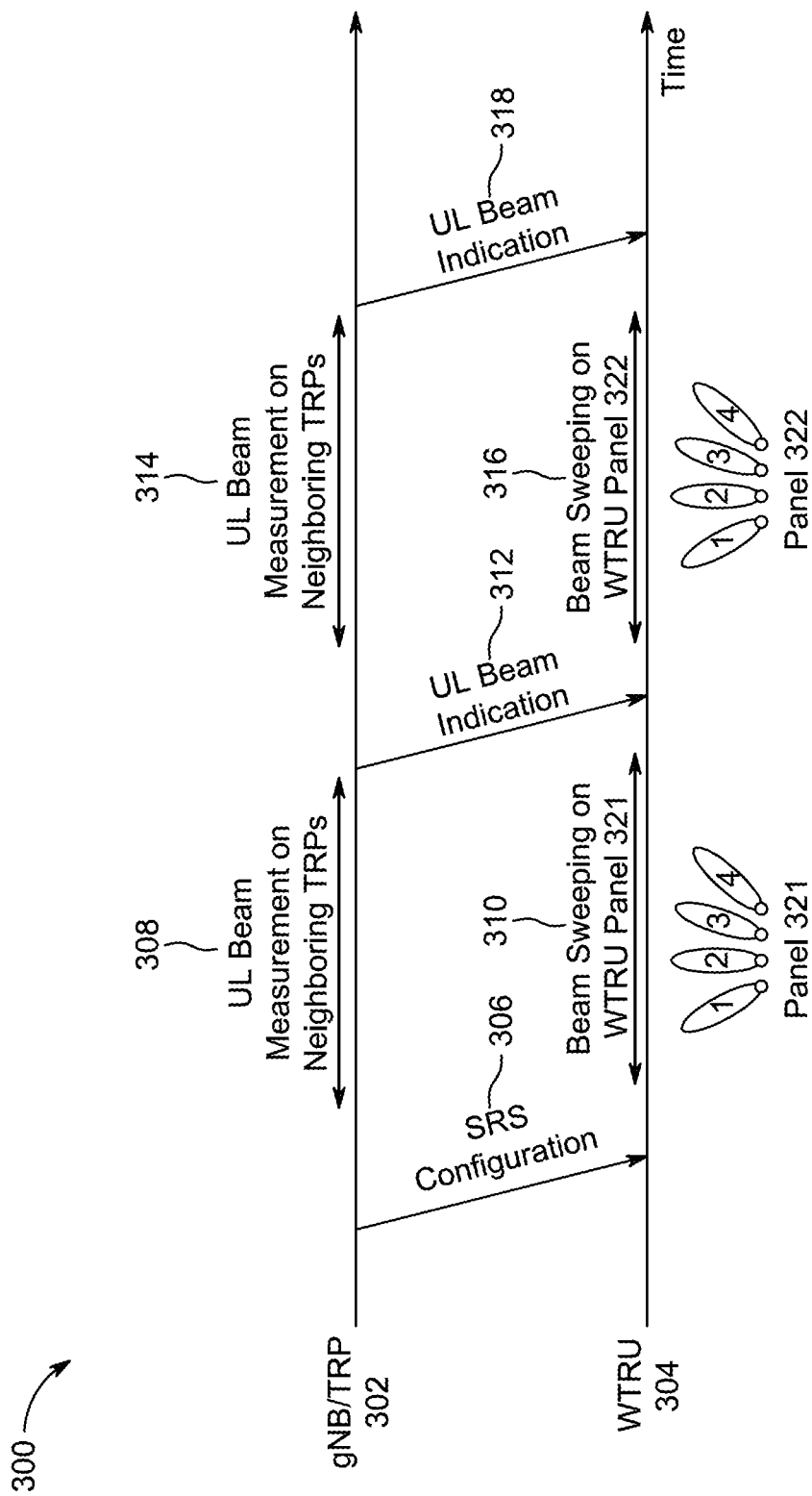
FIG. 3 shows a signaling diagram of an example beam sweeping procedure including separate and sequential (in time) UL TX beam sweeping at the WTRU among different WTRU antenna panels.

For each configured SRS resource set, when the parameter srs-AntennaPanelID (e.g., The ID of the WTRU antenna panel associated with a SRS resource set) is not configured, the SRS resource set may not be associated with a specific WTRU antenna panel. When the UL beam sweeping is performed, for example, the WTRU may transmit the SRS resources of a SRS resource set over different beams (e.g., U3) or over the same beam (e.g., U2), the SRS resources of the same SRS resource set are transmitted from different WTRU antenna panels. Separate UL beam sweeping among different WTRU antenna panels may be supported in this case, where the UL beam sweeping at the WTRU may be performed separately/sequentially by different WTRU antenna panels. This approach may incur small overhead of SRS configurations since the configured SRS resource sets are shared by different WTRU antenna panels. FIG. 3 shows a signaling diagram of an example beam sweeping procedure 300 including separate and sequential (in time) UL TX beam sweeping at the WTRU 304 among different WTRU antenna panels 321 and 322. The network, for example gNB/TRP 302, may send SRS configuration 306 to the multi-panel WTRU 304 to configure the WTRU 304 with at least one SRS resource set. The WTRU 304 may perform beam sweeping 310 and 315 one at a time (sequentially) on each antenna panel 321 and 322 using the same SRS resource set (i.e., transmit SRS in the UL on each of the beams of the respective antenna panels 321 and 322).

While the WTRU 304 performs the UL beam sweeping 310 and 316, the link between other antenna panels of the WTRU 302 and associated gNBs/TRPs (not shown) may remain active and the WTRU 304 may continue data and/or control signaling communications with other gNBs/TRPs. Because the same SRS resource set may be shared and transmitted by multiple WTRU panels, neighboring TRPs may be made aware of which of the multiple WTRU panels 321 and 322 is transmitting on the configured SRS resource set at a given time.

In an example, the WTRU 304 may be configured with an SRS transmission gap, where the slot offset and the WTRU panel ID or order are predefined by the network. When the neighboring TRPs are signaled (e.g. radio resource control (RRC) signaling) to measure the SRS transmissions from multi-panel WTRU 304, the neighboring TRPs may also receive the SRS transmission gap information. For example, as shown in FIG. 3, during the first round of beam sweeping 310 during a first time period (e.g., one or more symbols, one or more slots) the WTRU 304 performs beam sweeping at antenna panel 321 and the neighboring TRPs perform UL beam measurement 308 (e.g., from the beam sweeps 321 and 322), and during the second round of beam sweeping 316 the WTRU 304 performs beam sweeping at antenna panel 322 and the neighboring TRPs perform UL beam measurement 314. In another example not shown, the WTRU 304 or a TRP in the network (e.g., a primary TRP or default TRP) may send explicit signaling to other neighboring TRPs with the WTRU panel ID for the WTRU 304 and indication of a slot offset for the next transmission of partial or all SRS resources configured within the SRS resource set. Each SRS resource (time/frequency domain position) may correspond to a specific WTRU 304 TX beam (beam 1, 2, 3, 4 on panel 321 and 322) such that transmission of an SRS resource may be mapped to a specific beam. When an SRS resource is measured by the gNB/TRP 302 after a beam sweeping transmission, the gNB/TRP 302 may know which WTRU 302 beam is used. Based on the UL beam sweeping 310 and 312, the gNB/TRP 302 may select and assign UL TX beams to the WTRU 304 using UL beam indication frames 312 and 318, respectively.

Due to the share of configured SRS resources sets, the overall time duration of beam training may be large if the number of WTRU antenna panels and the SRS transmissions from each panel that needs to be trained are large. For example, for certain beam management procedures (e.g., a U1 beam management procedure) global beam sweeping may be supported. In another example, local beam sweeping may be supported, where a subset of beams of one panel or a subset of the overall WTRU panels may be refined, and the overall time cost may not be significant.

In an example, a multi-panel WTRU may perform separate/sequential UL TX beam sweeping for the SRS resource set(s) or/and SRS resources that have a higher layer parameter resourceType set to 'periodic' and/or 'semi-persistent'. In this case, sweeping delay may be tolerable and the overhead of SRS configurations may be significant in terms of long-term cost. In another example, the number of configured SRS resource sets may be the same as the number of WTRU antenna panels, and in this case the parameter srs-AntennaPanelID may not need to be configured. In other words, the index of each configured SRS resource set may implicitly represent the WTRU panel index.

Figure 4:
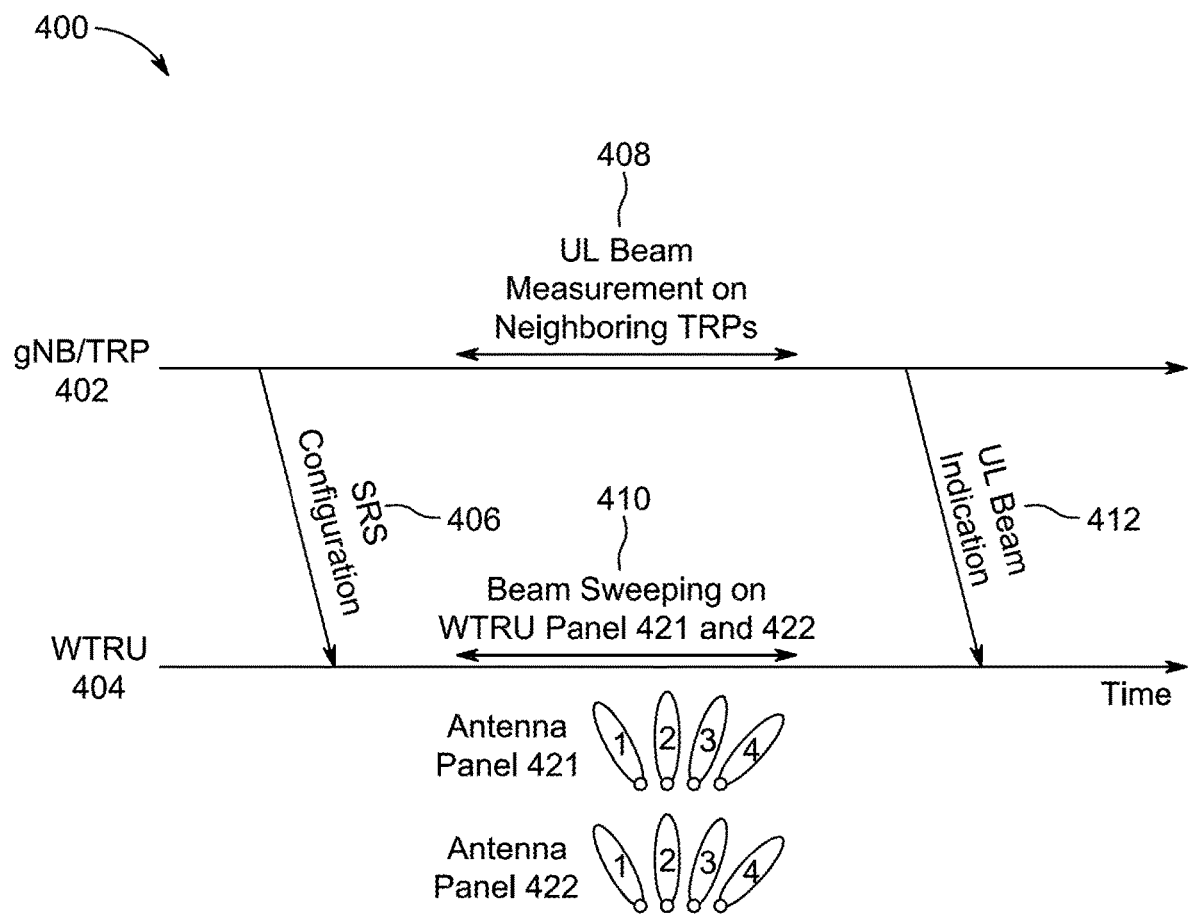
FIG. 4 shows a signaling diagram of an example beam sweeping procedure including joint/simultaneous (in time) UL TX beam sweeping at the WTRU among different WTRU antenna panels.

For each configured SRS resource set, when the parameter srs-AntennaPanelID is configured, the SRS resource set may be associated with a specific WTRU antenna panel. When the WTRU performs UL beam sweeping, the SRS resources from different SRS resource sets may be transmitted only from the specifically associated WTRU antenna panels. Joint UL beam sweeping among different WTRU antenna panels may be supported in this case, where the UL beam sweeping at the WTRU may be performed jointly/simultaneously by different WTRU antenna panels. FIG. 4 shows a signaling diagram of an example beam sweeping procedure 400 including joint/simultaneous (in time) UL TX beam sweeping at the WTRU 404 among different WTRU antenna panels 421 and 422. The network, for example gNB/TRP 402, may send SRS configuration 406 to the multi-panel WTRU 404 to configure the WTRU 404 with SRS resource sets. The WTRU 304 may perform beam sweeping 410 simultaneously on antenna panels 421 and 422 using different SRS resource set. In this case, the overhead of SRS configuration 406 may be higher than the sequential beam sweeping case because the configuration of SRS resource sets is panel specific and each WTRU 404 antenna panel 421 and 422 may be configured with one or multiple SRS resource sets. While the WTRU 404 performs the UL beam sweeping 410 simultaneously from multiple WTRU antenna panels 421 and 422 at the same a time, the links between the WTRU 404 antenna panels 421 and 422 performing UL beam sweeping 410, and associated TRPs/gNB may be affected, which means the data or control signaling communications of the WTRU 404 with the associated TRPs/gNB are interrupted.

The time to perform joint beam sweeping among different WTRU antenna panels may be less than the time to perform sequential beam sweeping, resulting in lower latency due to UL beam managements. In an example, a multi-panel WTRU may perform joint/simultaneous UL TX beam sweeping for the SRS resource set(s) or/and SRS resources that have the higher layer parameter resourceType set to 'aperiodic' or/and 'semi-persistent'. In this case, the configuration overhead of SRS resources may be tolerable due to one-time ('aperiodic') or short-term (semi-persistent) cost and the beam sweeping delay is more important and joint/simultaneous beam sweeping is accelerated.

In an example, panel specific configuration may be achieved without explicitly configuring parameters using a panel ID. For example, in order to differentiate the resources configured for each antenna panel, a group ID or pool ID may be used to realize the panel specific configuration. In this case, the example configuration shown in Table 2 may be modified to not include the AntennaPanelID explicitly, and to include a group ID or pool ID (or other similar IDs).

TABLE 2

Example SRS-Config IE for a multi-panel WTRU equipped with heterogeneous antenna panels

```
-- ASN1START
-- TAG-SRS-CONFIG-START
SRS-Config ::=                             SEQUENCE {
    ...
    srs-ResourceSetToAddModList            SEQUENCE (SIZE(1.. maxNrofSRS-ResourceSets)) OF SRS-
ResourceSet              OPTIONAL, -- Need N
    ...
    AntennaPanelIDlist     SEQUENCE (SIZE(1..maxNrofSRS-AntennaPanels)) OF AntennaPanelID
    srs-ResourceSetToAddModList  ::=       SEQUENCE (SIZE(1.. maxNrofSRS-AntennaPanels)){
        AntennaPanelID                     SEQUENCE (SIZE(1.. maxNrofSRS-ResourceSetsPerPanel)) OF
                                           SRS-ResourceSet                 OPTIONAL, -- Need M
        AntennaPanelID                     SEQUENCE (SIZE(1.. maxNrofSRS-ResourceSetsPerPanel)) OF
                                           SRS-ResourceSet                 OPTIONAL, -- Need M
        ...
    }
    ...
}
```

TABLE 2-continued

Example SRS-Config IE for a multi-panel WTRU equipped with heterogeneous antenna panels

```
SRS-ResourceSet ::=                    SEQUENCE {
    ...
    srs-AntennaPanelID                 AntennaPanelID              OPTIONAL,
    ...
}
-- TAG-SRS-CONFIG-STOP
-- ASN1STOP
```

In another example, a multi-panel WTRU may be equipped with heterogeneous antenna panels, such that each antenna panel may have different capabilities for UL TX beam (e.g., different number of supported beams, different magnitude of directional coverage). An example of SRS configuration (e.g., SRS-Config IE) for a multi-panel WTRU in this case is shown in Table 3. In this case, the WTRU may be configured with one or multiple SRS resource sets, and each SRS resource set may have different numbers of SRS resources to match the different number of beams on each WTRU antenna panel.

panels at the WTRU) or dynamically switch between high performance mode or low performance mode and dynamically send different capability parameters (or only the changes to the capability parameters) to the network.

Methods for SRS triggering and SRS transmissions are described herein. In the following examples, a multi-panel WTRU may be configured with one or more SRS resource configuration(s). Example WTRU configurations of SRS resource sets to support SRS triggering for a multi-panel WTRU are given in Table 4. With reference to the example configurations in Table 4, any of the following example

TABLE 3

Example SRS-Config IE for a multi-panel WTRU equipped with heterogeneous antenna panels

```
-- ASN1START
-- TAG-SRS-CONFIG-START
SRS-Config ::=                          SEQUENCE {
    ...
    srs-ResourceSetToAddModList         SEQUENCE (SIZE(1..maxNrofSRS-ResourceSets)) OF SRS-
ResourceSet       OPTIONAL,    -- Need N
    ...
    AntennaPanelIDlist         SEQUENCE (SIZE(1..maxNrofSRS-AntennaPanels)) OF AntennaPanelID
    srs-ResourceSetToAddModList  ::=    SEQUENCE (SIZE(1..maxNrofSRS-AntennaPanels)) {
        AntennaPanelID                  SEQUENCE (SIZE(1.. maxNrofSRS-ResourceSetsPerPanel)) OF
                                        SRS-ResourceSet                 OPTIONAL, -- Need M
        AntennaPanelID                  SEQUENCE (SIZE(1.. maxNrofSRS-ResourceSetsPerPanel)) OF
                                        SRS-ResourceSet                 OPTIONAL, -- Need M
        ...
    }
    ...
}
SRS-ResourceSet ::=                     SEQUENCE {
    ...
    srs-AntennaPanelID                  AntennaPanelID              OPTIONAL,
    ...
}
-- TAG-SRS-CONFIG-STOP
-- ASN1STOP
```

In an example, when a WTRU provides assistant (or assistance) information to the network (gNB/TRP) to assist UL beam management, WTRU capability information (e.g., any of the capability parameters described herein) may be transmitted in the WTRU capability reporting. In another example, WTRU capability information may be transmitted in other ways, for example by RRC signaling, implicit request, explicit request or WTRU initiated reporting. For example, a WTRU may include at least a subset of capability parameters (e.g., minimum WTRU capability parameters) in WTRU capability reporting in order to reduce the reporting overhead, and the WTRU may send the remaining capability parameters in subsequent messages (e.g., RRC signaling, medium access control element (MAC-CE), L1 messages), for example when the network requests the remaining capability parameters. In another example, for the purpose of energy preservation or other factors such as privacy, a WTRU may report lower capability (e.g., report and use a lower number of panels than the actual number of antenna actions may occur when the higher layer parameter resource Type in SRS-Resource and/or SRS-ResourceSet (e.g., as in Table 2) is set to 'aperiodic' (i.e., when the SRS resource sets are not configured for periodic use). In a first example action, the WTRU may receive a DCI (e.g., a downlink DCI, a group common DCI, or an uplink DCI based command) such that a codepoint of the DCI may trigger one or more SRS resource set(s) to be used for SRS transmission. In an example, a multi-panel WTRU may be configured with three SRS resource sets, and each resource set may have a corresponding resource set ID (e.g., srs-ResourceSetID 2, srs-ResourceSetID 3 and srs-ResourceSetID 4). In an example, the SRS resource sets with srs-ResourceSetIDs 2 and 3 may be configured with the higher layer parameter aperiodicSRS-ResourceTrigger set to 1. Table 5 shows an example 2-bit DCI SRS request field values to trigger one or multiple SRS resource sets for a multi-panel WTRU.

With reference to Tables 4 and 5, in the case that the WTRU receives a DCI with a DCI field for triggering SRS resource sets (e.g., a 2-bit or 3-bit SRS request field for triggering one or more SRS resource set(s)) set to '01', then SRS resource set(s) configured with higher layer parameter aperiodicSRS-Resource Trigger set to '1' are triggered, and in this example two SRS resource sets (srs-ResourceSetIDs 2 and 3) are triggered to be used for SRS transmission in appropriate symbol(s) and slots (e.g., as indicated by slot offset or symbol offset). In the case that the WTRU receives a triggering DCI for triggering SRS resource sets with value '10' (or 2), then SRS resource set(s) configured with higher layer parameter aperiodicSRS-Resource Trigger set to 2 are triggered, and in this example one SRS resource set (srs-ResourceSetIDs ID 4) is triggered to be to be used for SRS transmission. In the case that two SRS resource sets are triggered for use for SRS transmission, the WTRU may perform UL beam sweeping from two WTRU antenna panels. In the case that one SRS resource set is triggered, the WTRU may perform UL beam sweeping from one WTRU antenna panel. If the triggering DCI contains a DCI field indicating specific WTRU panel(s), the indicated WTRU antenna panel may override the high layer parameter srs-AntennaPanelID configured for the triggered SRS resource set(s) in the SRS configuration IE. If the triggered SRS resource set(s) are configured with srs-AntennaPanelID in the SRS configuration, the WTRU may transmit the triggered SRS resource sets from the associated WTRU antenna panels in a future slot. For example, the future time slot may be determined based on the high layer parameter slotOffset.

If the triggered SRS resource set(s) are not configured with srs-AntennaPanelID in the SRS configuration, the WTRU may transmit the triggered SRS sets by following default rules or by using pre-defined WTRU antenna panels. Any of the following example rules may be used by a WTRU to select a WTRU antenna panel for the transmission on triggered SRS resource set(s) (e.g., in the case that srs-AntennaPanelID was not configured). In an example rule, the WTRU may select from the set of currently active WTRU antenna panels with on-going signals or data transmissions. In some cases, not all antenna panels on a WTRU may be active at all times, for example for interference reduction or power saving. In another example rule, the WTRU may select from the set of WTRU panel(s) with link(s) quality (e.g., layer one reference signal received power (L1-RSRP), L1-RSRQ, block error rate (BLER)) below (or above) a pre-determined threshold. In another example rule, the WTRU may select from the set of WTRU panel(s) with beams transmitting signaling messages/data on one or multiple default BWP(s) or CC(s). In another example rule, the WTRU may select from the set of WTRU panel(s) with beams within a certain (e.g., pre-determined) directional coverage. In another example rule, the WTRU may select from the set of WTRU panel(s) that are explicitly or implicitly requested by the network (gNB or TRP). For example, when the quality of a link between a WTRU panel and a TRP drops (which may be determined based on a TRP L1-RSRP measurement), the TRP may explicitly (e.g., send a triggering DCI including the antenna panel ID of WTRU panels) and/or implicitly (e.g., send a triggering DCI indicating SRS resource set(s) that have high layer parameter srs-AntennaPanelID configured) request the WTRU to perform an UL TX or RX beam sweeping from a subset of the implicitly or explicitly indicated WTRU panels.

In some cases, the number of the triggered SRS resource sets may be less than or equal to the number of WTRU antenna panels, which may be determined (e.g., based on rules defined herein) to perform UL beam training (e.g., using a U2 or U3 beam management procedure), the triggered SRS resource sets may be transmitted using any one or more of the following example methods. In an example, if the triggering DCI contains DCI field(s) indicating WTRU antenna panels, the SRS resources of the triggered SRS resource set(s) may be transmitted from the WTRU panels indicated by the DCI field(s), which may override the WTRU panels indicated by the high layer parameter srs-AntennaPanelID of each triggered SRS resource set. If no DCI fields indicate WTRU antenna panels, for the triggered SRS resource set(s) configured with srs-AntennaPanelID(s), the SRS resources of the triggered SRS resource set(s) may be used for transmitting SRS from the WTRU panels indicated by the srs-AntennaPanelID(s).

If the triggered SRS resource set(s) is not configured with srs-AntennaPanelID and no DCI field in the triggering DCI indicates WTRU antenna panel(s), then SRS resource availability may be considered. For example, if only one SRS resource in each of triggered SRS resource set may be may be used for transmission at a given time instant, then at the given time instant, the WTRU may transmit in the triggered SRS resource set(s) from the same number of WTRU panels (e.g., simultaneously as in FIG. 4 or sequentially as in FIG. 3). If the number of triggered SRS sets is less than the number of WTRU panels that need to perform UL beam training, some of the triggered SRS sets may be shared by more than one WTRU panels. In this case, the neighboring TRPs may be informed of the WTRU panel ID(s) at the time each shared SRS resource set is transmitted (e.g., as shown in FIG. 3). For example, the WTRU may be configured with an SRS transmission gap known to the network in advance. In another example, the network may receive explicit notifications of the WTRU panel(s) to be used for beam sweeping before each shared SRS resource set is transmitted.

TABLE 4

Example WTRU configurations of SRS resource sets
to support SRS triggering for a multi-panel WTRU -- ASN1START
-- TAG-SRS-CONFIG-START
...
SRS-ResourceSet ::=                      SEQUENCE {
    srs-ResourceSetId                        2,
    ...
    srs-AntennaPanelID                       AntennaPanelID    OPTIONAL,
    resourceType                             CHOICE {
        aperiodic                                SEQUENCE {
            aperiodicSRS-ResourceTrigger             1,
            ...
        },
        ...
    }
    ...
}

TABLE 4-continued

Example WTRU configurations of SRS resource sets
to support SRS triggering for a multi-panel WTRU

```
SRS-ResourceSet ::=                      SEQUENCE {
    srs-ResourceSetId                        3,
    ...
    srs-AntennaPanelID                   AntennaPanelID    OPTIONAL,
    resourceType                         CHOICE {
        aperiodic                            SEQUENCE {
            aperiodicSRS-ResourceTrigger         1,
            ...
        },
        ...
    }
    ...
}
SRS-ResourceSet ::=                      SEQUENCE {
    srs-ResourceSetId                        4,
    ...
    srs-AntennaPanelID                   AntennaPanelID    OPTIONAL,
    resourceType                         CHOICE {
        aperiodic                            SEQUENCE {
            aperiodicSRS-ResourceTrigger         2,
            ...
        },
        ...
    }
    ...
}
...
-- TAG-SRS-CONFIG-STOP
-- ASN1STOP
```

TABLE 5

Example 2-bit DCI SRS request field to trigger one
or more SRS resource sets for a multi-panel WTRU

| Value of the DCI field | Triggered aperiodic SRS resource set(s) | Single panel or multi-panel SRS transmissions |
|---|---|---|
| 00 | No aperiodic SRS resource set triggered | N/A |
| 01 | SRS resource set(s) configured with higher layer parameter aperiodicSRS-ResourceTrigger set to 1 | SRS resource set 2 and set 3 are transmitted from 2 WTRU antenna panels |
| 10 | SRS resource set(s) configured with higher layer parameter aperiodicSRS-ResourceTrigger set to 2 | SRS resource set 4 is transmitted from 1 WTRU antenna panel |
| 11 | SRS resource set(s) configured with higher layer parameter aperiodicSRS-ResourceTrigger set to 3 | |

Figure 5:
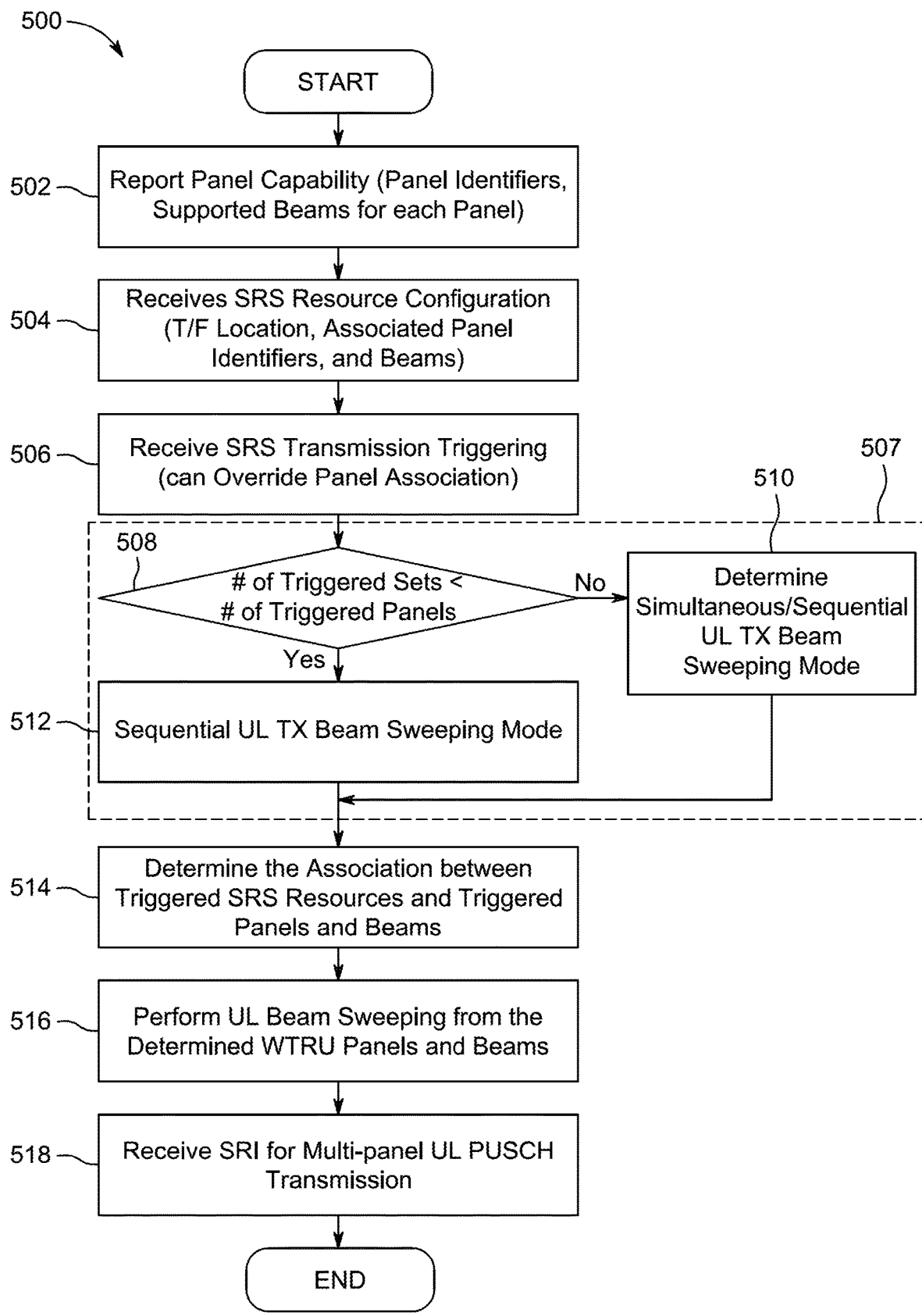
FIG. 5 is a flow diagram of an example beam sweeping mode selection and antenna panel association procedure for multi-TRP based SRS transmissions using SRS resources, which may be part of an UL beam management procedure.
Figure 6:
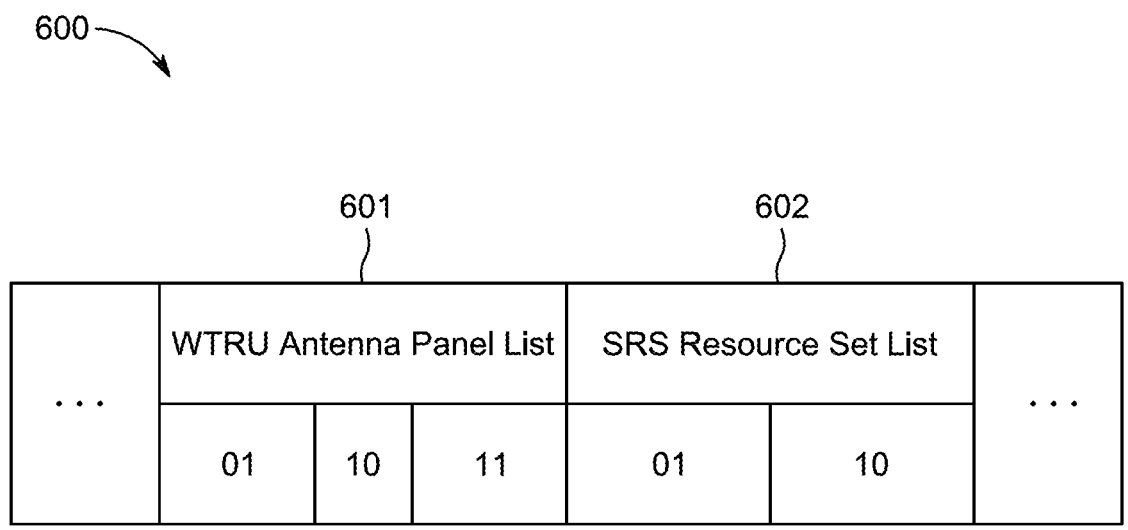
FIG. 6 shows a frame format of an example DCI frame that may be used as an SRS transmission trigger frame.

FIG. 5 is a flow diagram of an example beam sweeping mode selection and antenna panel association procedure 500 for multi-TRP based SRS (or reference signal (RS)) transmissions using SRS resources, which may be part of an UL beam management procedure. At 502, the WTRU may send or report antenna panel capability information (e.g., to the TRP/gNB). The antenna panel capability information may indicate, for example, any of the following information: a number of WTRU antenna panels; antenna panel IDs identifying the antenna panels at the WTRU; and/or a number of supported beams for each antenna panel at the WTRU. At 504, the WTRU may receive (e.g., from the TRP/gNB) an SRS resource configuration for configuring SRS resources and/or associated antenna identifiers. The SRS resource configuration may indicate any of the following information: time/frequency (TF) location information of the configured SRS resource set(s); associated antenna panel identifiers (IDs) identifying antenna panels at the WTRU for the configured SRS resource set(s); and/or beams for the configured SRS resource sets. At 506, the WTRU may receive (e.g., from the TRP/gNB) an SRS transmission trigger frame identifying triggered SRS resource sets from the set of configured SRS resource sets to be used for SRS transmission. The SRS transmission trigger may indicate antenna IDs of antenna panels at the WTRU to be used with the triggered SRS resource sets. The identified antenna panels may override previously signaled antenna panel associations at the WTRU (e.g., previous antenna panel associations in the SRS resource configuration). Thus, the WTRU may identify the antenna panels to be used with the triggered RS resource sets based on the SRS configuration and/or the RS transmission trigger information (with or without override). FIG. 6 shows a frame format of an example DCI frame 600 that may be used as an SRS transmission trigger frame including a WTRU antenna panel field 601 (which may be in the form of a list) and an SRS resource set triggering field 602 (which may be in the form of a list) for UL beam sweeping. Not all fields of the DCI frame 600 are shown.

Figure 7:
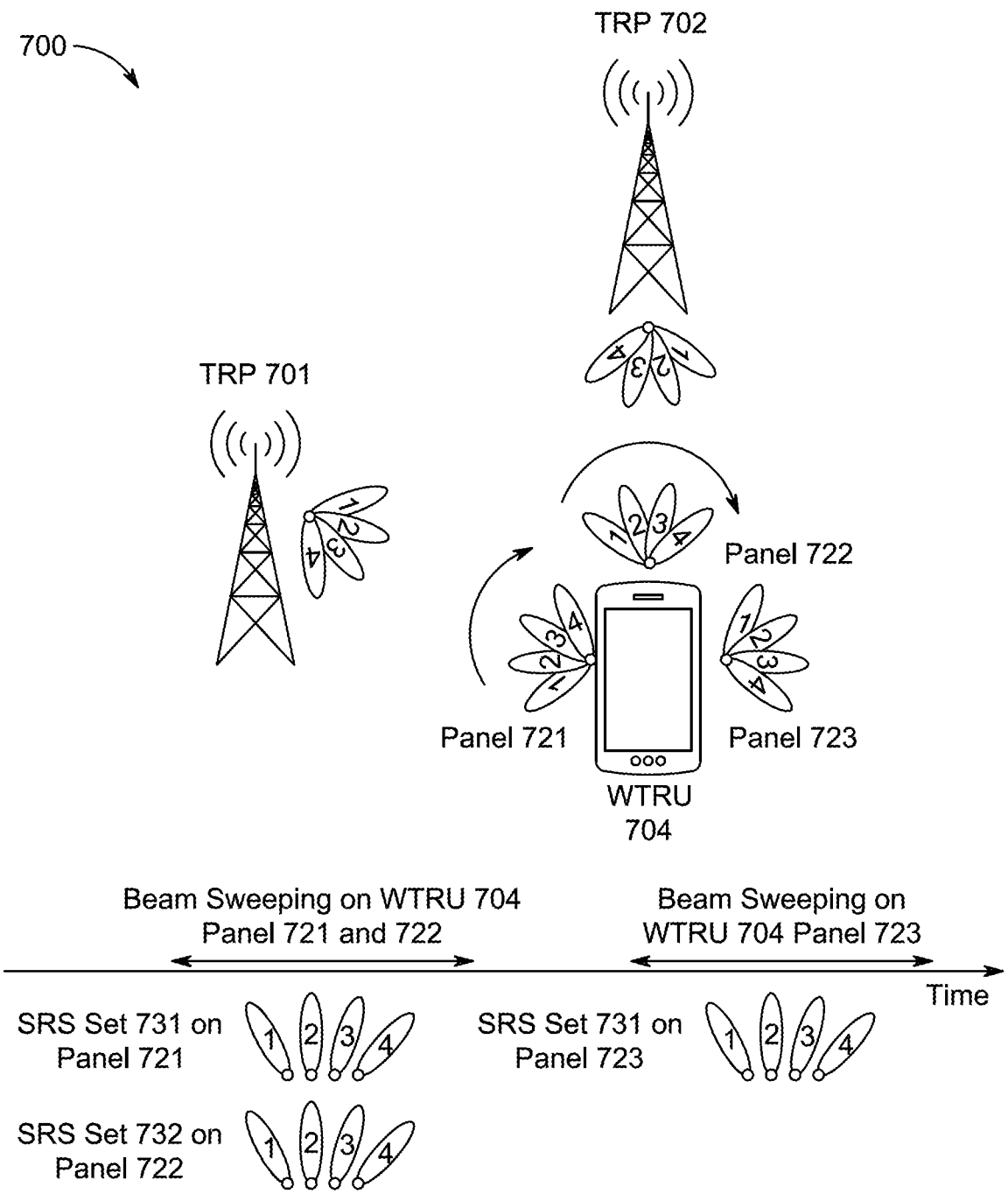
FIG. 7 shows a signaling diagram of an example beam sweeping procedure including simultaneous and sequential UL TX beam sweeping at the WTRU among different WTRU antenna panels.

With reference to FIG. 5, at 507, the WTRU may determine an UL TX beam sweeping mode based on the triggered SRS resource sets and the identified antenna panels, for example according to the example procedure given in steps 508-512. At 508, the WTRU may compare the number of triggered SRS resource sets to the number of identified antenna panels. If the number of triggered SRS resource sets is less than the number of identified antenna panels, then the WTRU may use a sequential UL TX beam sweeping mode (e.g., as shown in FIG. 3 or FIG. 7). If the number of triggered SRS resource sets is equal to (or more than) the number of identified antenna panels, then the WTRU may use a sequential UL TX beam sweeping mode (e.g., as shown in FIG. 3 or FIG. 7) or a simultaneous UL TX beam sweeping mode (e.g., as shown in FIG. 4 or FIG. 7). In another example, the WTRU may determine an UL TX beam sweeping mode based on explicit signaling received from the gNB/TRP.

At 514, the WTRU may determine an association between the triggered RS resources sets and the set of antenna panels. For example, the association may be determined based on implicit indication of antenna panel ID from SRS resource set ID(s) or implicit indication of antenna panel ID from beam ID(s). In another example, the association may be determined based on explicitly indicated antenna panel ID(s) in the resource set configuration. In another example, the association may be determined based on dynamic signaling (e.g., from the gNB/TRP) explicitly indicating antenna panel ID(s). At 516, the WTRU may perform UL beam sweeping using the triggered RS resource sets and the set of antenna panels according to the association between the triggered RS resources sets and the set of antenna panels. At 518, the WTRU may receive (e.g., from the gNB/TRP) an RS resource indicator (SRI) for multi-panel UL physical uplink shared channel (PUSCH) transmission to transmit uplink data using multiple antenna panels from the plurality of antenna panels. For example, the SRI may have been determined by the TRP based on the UL beam sweeping using the triggered RS resource sets and the set of antenna panels.

FIG. 7 shows a signaling diagram of an example beam sweeping procedure 700 including simultaneous and sequential UL TX beam sweeping at the WTRU 704 among different WTRU antenna panels 721, 722, 723. In the example beam sweeping procedure 700, the WTRU 704 may have three antenna panels 721, 722, 723 to communicate with multiple TRPs 701 and 702 and may have two triggered SRS resource sets 731 and 732 that can be used simultaneously. During a first time period, the WTRU 704 may perform beam sweeping using SRS resource set 731 on antenna panel 721 at the same time (simultaneously) the WTRU 704 performs beam sweeping using SRS resource set 733 on antenna panel 722. In a next time period and thus sequentially, the WTRU 704 may perform beam sweeping using SRS resource set 731 on antenna panel 723.

If more than one SRS resource in each of triggered SRS resource set may be used for transmission at a given time, then at the given time the WTRU may transmit the triggered SRS resource set(s) from the same or larger number of WTRU panels simultaneously (e.g., FIG. 4 or FIG. 7) or sequentially (e.g., FIG. 3 or FIG. 7).

Figure 8:
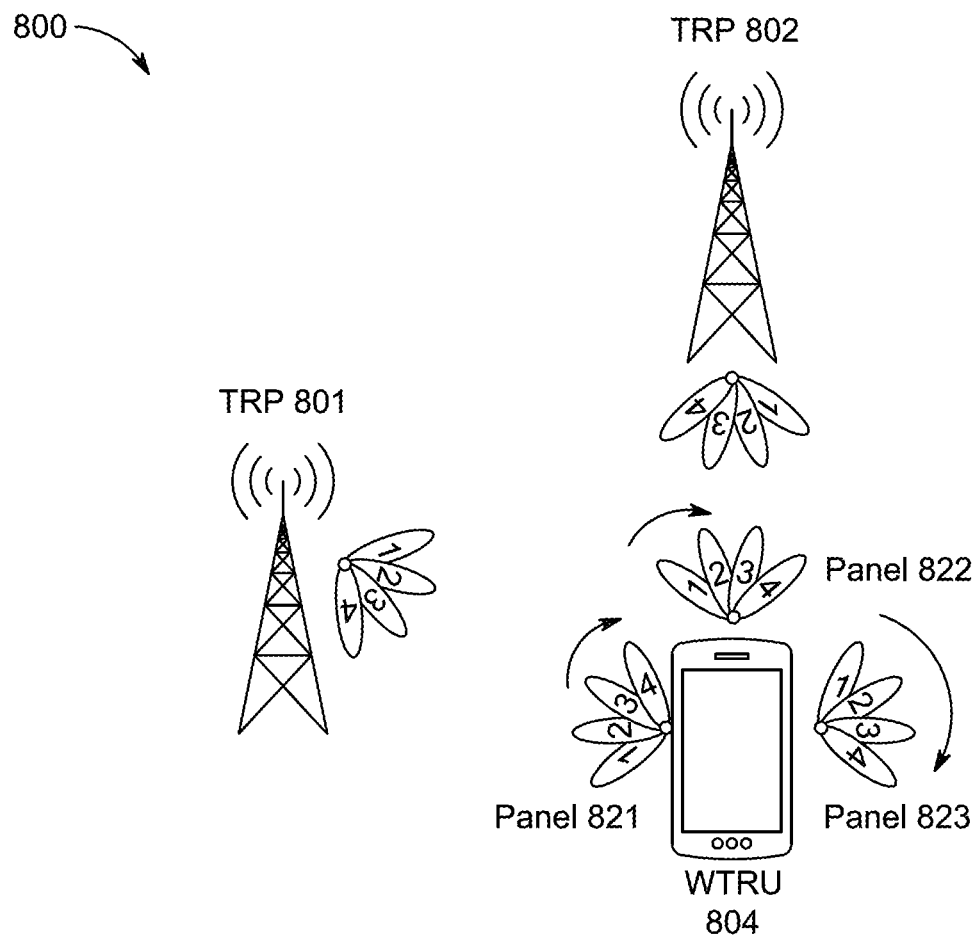
FIG. 8 shows a signaling diagram of an example beam sweeping procedure including simultaneous UL TX beam sweeping at the WTRU among different WTRU antenna panels using different SRS resources within an SRS resource set.
Figure 8:
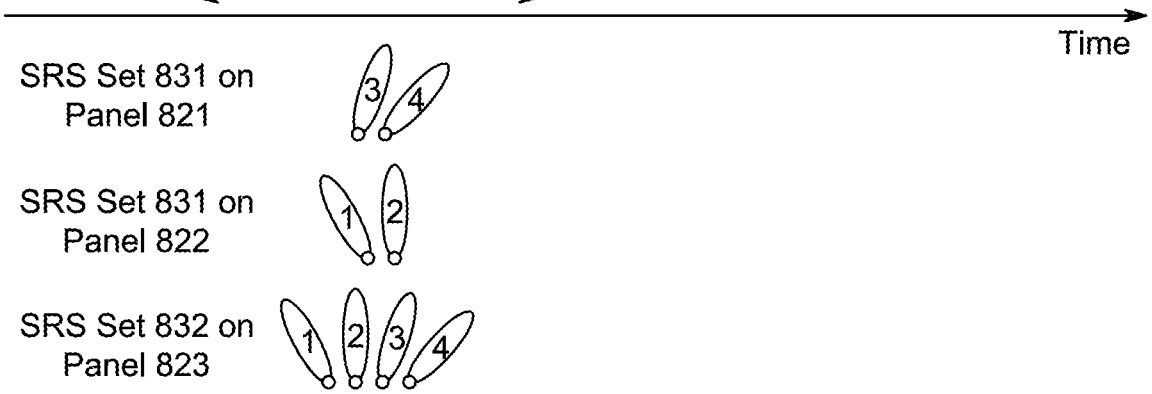

FIG. 8 shows a signaling diagram of an example beam sweeping procedure 800 including simultaneous UL TX beam sweeping at the WTRU 804 among different WTRU antenna panels using different SRS resources within a set. In the example beam sweeping procedure 800, the WTRU 804 may have three antenna panels 821, 822, 823 to communicate with multiple TRPs 801 and 802 and may have two triggered SRS resource sets 831 and 832 that can be used simultaneously. In the example beam sweeping procedure 800, two SRS resource sets 831 and 832 are triggered, and the WTRU 804 transmits on SRS set 831 using the WTRU antenna panels 821 and 822 simultaneously during the same time period. However, due to the limited number of SRS resources in the SRS resource set 831, WTRU 804 may perform local beam sweeping (e.g., sweeping beams 3 and 4 at panel 821, and sweeping beams 1 and 2 at the panel 822) on antenna panels 821 and 822, while simultaneously the WTRU performs a beam sweep on the SRS resource set 832 using WTRU antenna panels 823 using all beams (e.g., beams 1, 2, 3, 4 at panel 723).

Once a configured SRS resource set(s) is determined/triggered for the SRS transmissions from a specific panel (e.g., associated with the antenna panel), the WTRU may determine the beam(s) to be used for each SRS resource within the triggered SRS resource set(s). In an example, a higher layer parameter spatialRelationInfo may contain a DL RS ID, (e.g., CSI-RS Resource Indicator (CRI), SS/PBCH Resource Block Indicator (SSBRI), the ID of a reference 'ssb-Index' or 'csi-RS-Index') or UL RS ID (e.g., SRS, the ID of a reference "srs"), which may be used to configure each SRS resource and indicate the beam (e.g., spatial domain transmission filter) to be used by each SRS resource in the triggered SRS resource set(s).

In single-panel case where a single antenna panel is associated with the triggered SRS resources sets, the DL RS ID may uniquely represent a DL TX beam for a specific TRP/gNB, and the SRS ID may uniquely represent a UL TX beam for the WTRU.

In multi-panel case where a multiple antenna panels are associated with the triggered SRS resources sets, if the RS ID is defined locally within an antenna panel, there may be an ambiguity that a WTRU may not be able to identify the indicated beam if multiple panels use a local beam ID space (e.g., the IDs used for identifying beams may be the same on different antenna panels). For example, for DL RS ID, if two panels of a TRP transmit WTRU specific CSI-RS resources simultaneously, and two DL TX beams (one beam from each panel of the TRP) may have the same CRI, such as CRI #3. When CRI #3 is configured to spatialRelationInfo for a SRS resource at a later time, the WTRU may not identify which DL TX beam is indicated by the CRI #3.

Any of the following example mechanisms may be used to resolve the ambiguity of beam identity across different antenna panels. In an example approach, an extended RS ID may be used. For DL RS ID, a WTRU may be configured with multiple sets of CSI-RS resources, and/or a set of CSI-RS resources with multiple groups. In an example, a WTRU may be configured with multiple CSI-RS resource pools, where each resource pool includes multiple resource sets. In another example, a WTRU may be configured with multiple resource settings, and each resource set maybe associated with one TRP/gNB panel. In another example, synchronization signal block (SSB) resources may be grouped in multiple sets, where each group is transmitted from one TRP/gNB panel. When a CSI-RS resource or SSB resource is measured by a WTRU, the RS ID for CSI-RS resource or SSB resource may be differentiable by group ID, set ID or pool ID. For example, an DL RS ID include several segments/parts, and one segment/part may represent the group ID or set ID or pool ID, and another segment/part may represent the RS ID within a group, a set or a pool.

Similarly, the UL RS ID may be defined. When WTRU specific SRS resources are configured, there may be multiple SRS resource groups or sets or pools configured. The SRS ID (e.g., SRI) of each group or set or pool may contain several segments/parts as well. One segment/part may represent the group ID or set ID or pool ID, and another segment/part may represent the RS ID within a group, a set or a pool.

In another example approach to resolve the ambiguity of beam identity across different antenna panels, an RS ID may be associated with a specific UL or DL panel. When a DL RS ID is indicated or configured, the DL RS ID may refer to the DL RS measured most recently on the associated WTRU panel. For example, if two panels of a TRP transmit CSI-RS simultaneously, two DL TX beam may be indexed as a common name (e.g., CRI #3). If the two DL TX beams with the same name (e.g., CRI #3) are measured by the same WTRU panel, the two DL beams are determined to be with respect to the same RX beam at the WTRU. If beam correspondence holds at the WTRU, there is no ambiguity and the WTRU may be able to use the same DL RX beam as the UL TX beam to transmit on associated SRS resource(s) if its higher layer parameter spatialRelationInfo is configured with the common name (e.g., CRI #3). If the two DL TX beams with the same name (e.g., CRI #3) are measured by different WTRU panels, then the name CRI #3 may indicate the DL TX beam measured by the respective WTRU panel. For example, if the WTRU needs to determine UL TX beam of a SRS resource configured with CRI #3 (contained by spatialRelationInfo of this SRS resource) for a WTRU panel, the WTRU may assume the CRI #3 indicates the DL TX beam most recently measured by the same WTRU panel. If this WTRU panel does not measure any DL TX beam with the name CRI #3, but configured with a SRS resource which contains CRI #3, the WTRU may just ignore this configured beam CRI #3 and consider the high parameter spatialRelationInfo is not configured. Similarly, when a UL RS ID is indicated or configured for a SRS resource, such as SRI #4, this ID only refers to the beam index from the same WTRU panel where the SRS resource is configured to be transmitted. In an example, if an SRS resource ID 5 is configured to transmitted by a WTRU panel, the SRI #4 contained by the high parameter spatialRelationInfo of SRS resource with ID 5 may indicate the beam of the same WTRU panel that most recently transmitted the SRS resource with ID 4.

In another example approach to resolve the ambiguity of beam identity across different antenna panels, a parameter (e.g., a panel ID, group ID, set ID, or any parameter to differentiate panel specific configuration for beamforming such as a group or set of beams) may be used to differentiate beam IDs from different TRP panels or WTRU panels.

Figure 9A:
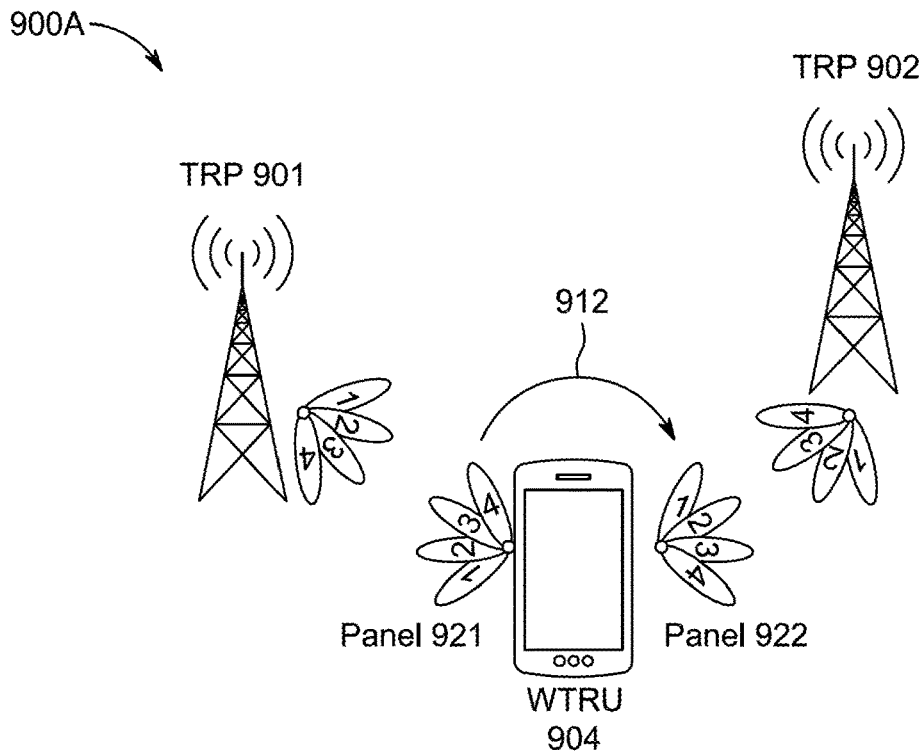
FIG. 9A shows a network diagram of an example beam pair link refinement.
Figure 9B:
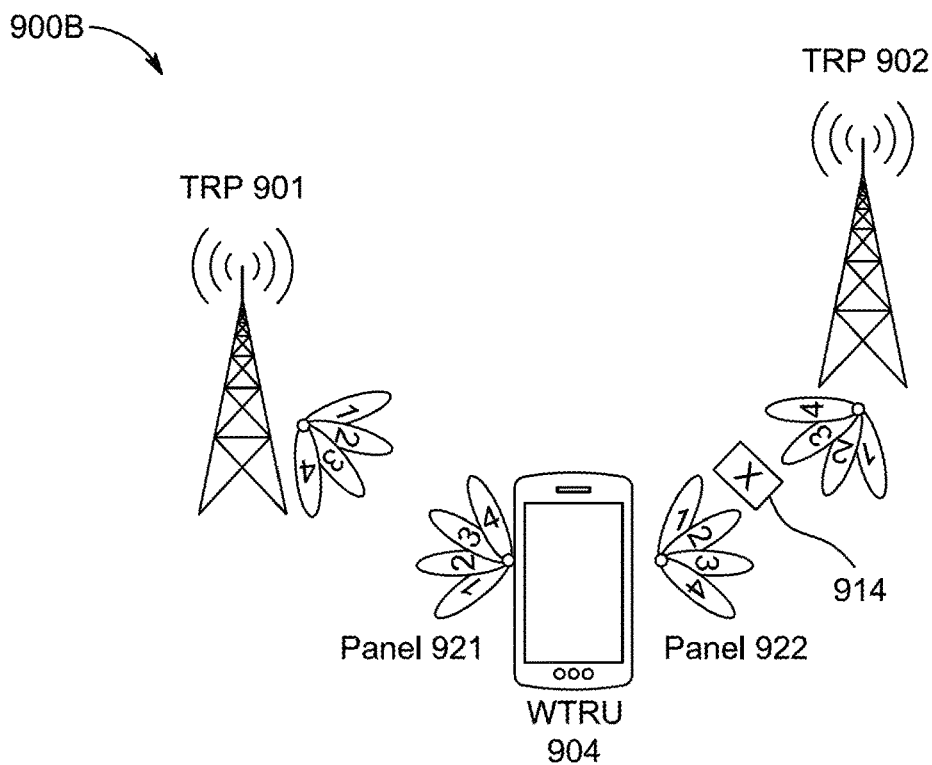
FIG. 9B shows a network diagram of another example beam pair link refinement.

DL beam management methods for multi-TRP/panel transmission are described herein. In an example method, beam measurement and reporting may be configured to reduce overhead and latency involved in beam measurement and reporting configuration. In an example, DL beam measurement and reporting for multi-TRP/panel transmissions may be configured by the gNB. In another example, a WTRU may request the amount of resources/sets for DL RSs (e.g., CSI-RS) for DL beam management. FIGS. 9A and 9B show network diagrams of example of beam pair link refinement 900A and 900B, respectively. In FIG. 9A, the rotation 912 of the WTRU 904 may cause beam pair links on WTRU panels 921 and 922 with TRPs 901 and 902, respectively, to be refined. In FIG. 9B, the beam blockage 914 between the WTRU 904 and TRP 902 may cause beam pair link on WTRU panel 922 to be refined (and not on antenna 921). In beam pair link refinement 900A and 900B, the amount of DL reference signal resources/sets needed may be different. Any of the following example procedures may be used for a WTRU to indicate the amount of DL reference signal resources/sets needed.

In an example of indicating the amount of DL reference signal resources/sets needed, the WTRU may perform capability reporting. Based on reported WTRU capability parameters a WTRU may be configured with one or multiple DL reference signal resources/sets. In an example, each resource set may be associated with a TRP panel as shown in Table 6, where the high layer parameter indicates the ID of the associated with TRP panel. In another example, one resource set may include subsets/groups of resources. Each group or subset of resources may be associated with a TRP panel as shown in Table 7, where the high layer parameter indicates the ID of the associated TRP panel.

TABLE 6

Example DL RS resource set IE for
multi-panel DL beam management

```
-- ASN1START
-- TAG-NZP-CSI-RS-RESOURCESET-START
NZP-CSI-RS-ResourceSet ::=    SEQUENCE {
    nzp-CSI-ResourceSetId         NZP-CSI-RS-ResourceSetId,
    nzp-CSI-ResourceSetPanelID    TRP-AntennaPanelId,
    nzp-CSI-RS-Resources          SEQUENCE (SIZE
(1..maxNrofNZP-CSI-RS-Resources PerSet))
                                  OF NZP-CSI-RS-ResourceId,
    ...
}
-- TAG-NZP-CSI-RS-RESOURCESET-STOP
-- ASN1STOP
```

TABLE 7

Example DL RS resource set IE for multi-panel DL beam management

```
-- ASN1START
-- TAG-NZP-CSI-RS-RESOURCESET-START
NZP-CSI-RS-ResourceSet ::=  SEQUENCE {
    nzp-CSI-ResourceSetId      NZP-CSI-RS-ResourceSetId,
    nzp-CSI-RS-Resources       CHOICE {
        group0                 SEQUENCE (
            panelID                TRP-AntennaPanelId,
            resources              SEQUENCE (SIZE (1..maxNrofNZP-CSI-RS-PerPanel))
OF
                                   NZP-CSI-RS-ResourceId
        },
        group1                 SEQUENCE (
            panelID                TRP-AntennaPanelId,
            resources              SEQUENCE (SIZE (1..maxNrofNZP-CSI-RS-PerPanel))
OF
                                   NZP-CSI-RS-ResourceId
        },
        ...
    }
    ...
}
-- TAG-NZP-CSI-RS-RESOURCESET-STOP
-- ASN1STOP
```

In another example, the WTRU may send an explicit request of a of DL RS resources/sets required for DL beam training. This explicit request may be carried in a message (e.g., at L1, MAC-CE or RRC) or piggybacked on a data or control message. For example, the WTRU may transmit a list of WTRU panels (e.g., one or multiple WTRU panel IDs) to the network, by assuming the network is aware of the required amount of DL RS resources/sets from a history request or WTRU capability reporting. In another example, the WTRU may send an implicit request of a of DL RS resources/sets required for DL beam training. Using an implicit request, the WTRU may transmit a value of DL RS AperiodicTriggerState to the network. As a response, the network (TRP/gNB) may send back a triggering DCI to trigger one or more aperiodic DL RS resource set(s) for beam measurements.

With the assistance information from the WTRU, the WTRU may be configured by the gNB to perform more efficient DL beam measurement and reporting. For example, an efficient beam reporting periodicity for a P1 beam management procedure may be configured to reduce latency. FIG. 10 shows a signaling diagram of an example beam sweeping procedure 1000 including appropriate configuration of reporting periodicity 1020 to reduce latency of beam training. As shown in FIG. 10, an appropriate value of reporting periodicity 1020 may be configured for the WTRU 1004 according to the assistance information (not shown) from the WTRU 1004 and provided to the TRP 1001 in terms of the capability of related WTRU 1004 antenna panels. The example beam sweeping procedure 1000 may include the TRP 1001 providing the WTRU 1004 with DL RS configuration 1006, the TRP 1001 performing beam sweeping 1010 on panels 1041 and 1042 simultaneously in a first time period and the TRP 1001 performing beam sweeping repetitions 1016 on panels 1041 and 1042 simultaneously during a second time period during the reporting periodicity 1020, and the WTRU 1004 send the beam measurement reporting 1018 to the gNB based on the DL beam sweeping.

Figure 11:
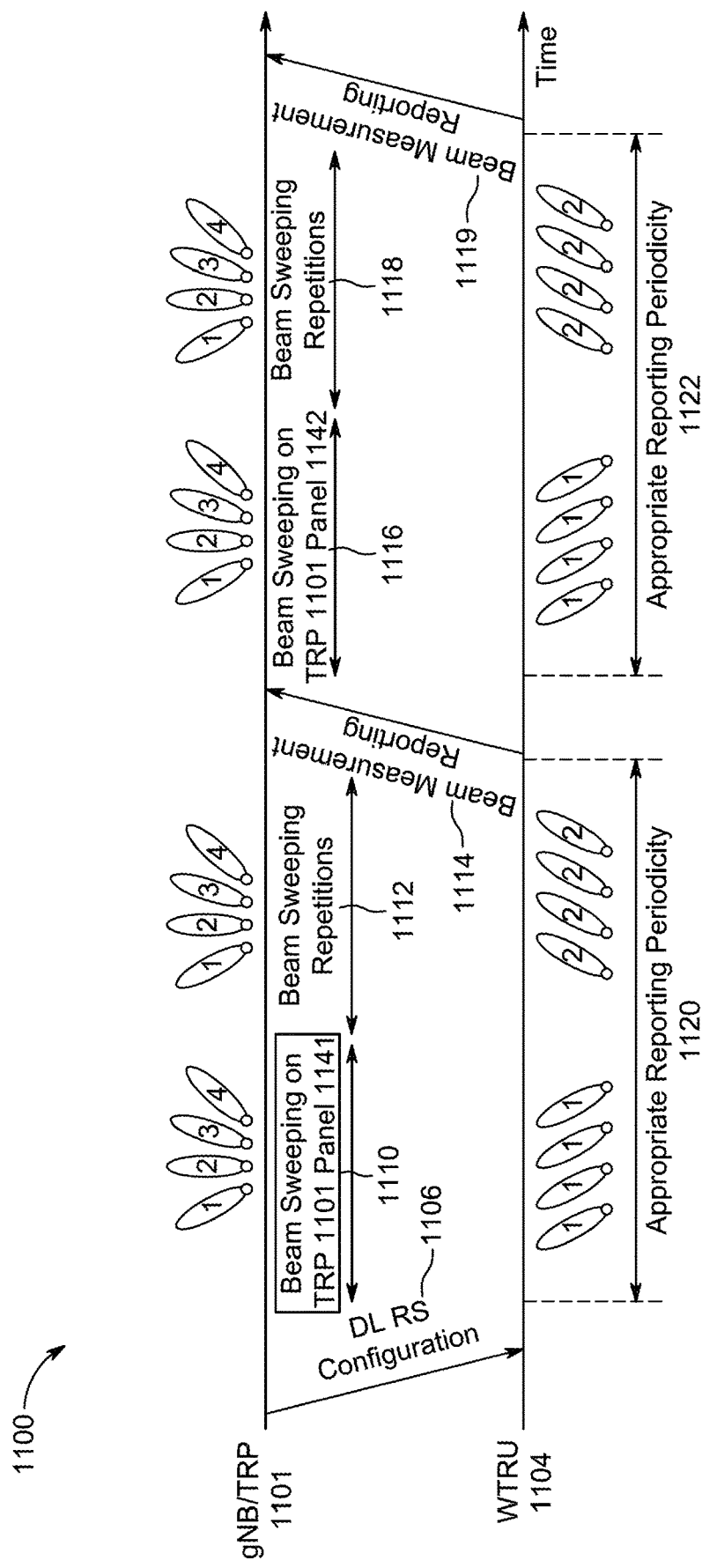
FIG. 11 shows a signaling diagram of an example beam sweeping procedure including appropriate configuration of reporting periodicity.

In another example, an efficient beam reporting periodicity for a P1 beam management procedure may be configured to reduce configuration overhead. FIG. 11 shows a signaling diagram of an example beam sweeping procedure 1100 including appropriate configuration of reporting periodicity 1120 and 1122 to reduce configuration overhead of beam training. As shown in the FIG. 11, the same set of DL RS resource is shared by both TRP 1101 panels 1141 and 1142 during appropriate reporting periodicity 1120 and 1122 to reduce the DL RS configuration 1106 overhead. The WTRU 1104 may perform the independent beam measurement reporting 1114 and 1119 after respective beam sweeping 1110 and 1112 and beam sweeping 116 and 1118 completion on each respective TRP 1101 panel 1141 and 1142 (e.g., there is no ambiguity at the TRP 1101).

In an example, a more efficient DL RX beam sweeping for a P3 and P1 beam management procedure may be configured. For P1, as shown in FIG. 10 and FIG. 11, with the assistance information from the WTRU, the network (TRP/gNB) is able to configure the DL RS resources to be minimally repeated, such as only one repetition (e.g., the involved WTRU panel may include only two DL RX beams, or WTRU may perform local RX beam sweeping on the involved WTRU so that only 2 RX beams are swept).

Figure 12:
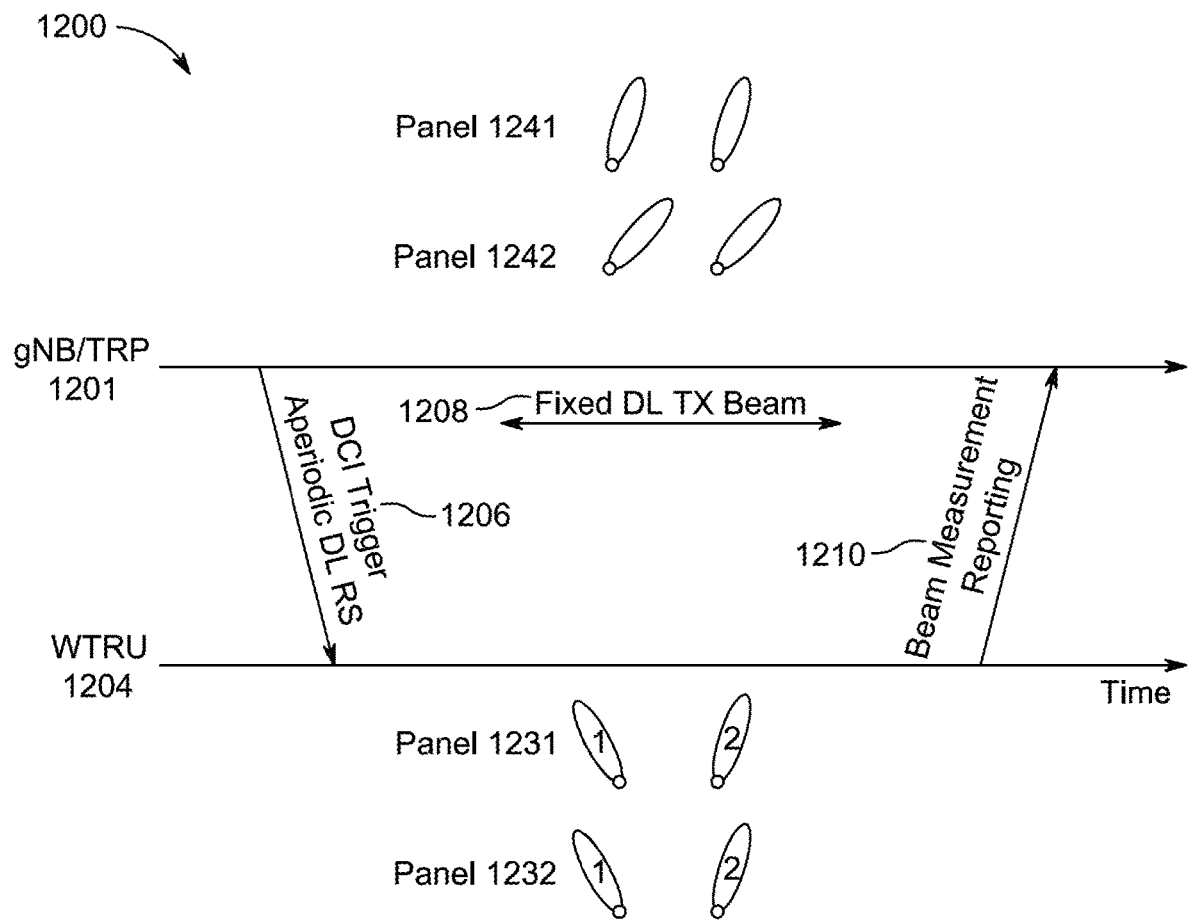
FIG. 12 shows a signaling diagram of an example DL RX beam sweeping procedure at the WTRU.

FIG. 12 shows a signaling diagram of an example DL RX beam sweeping procedure 1200 at the WTRU 1204 by configuring an appropriate number of CSI-RS resources. For a P3 procedure with the example DL RX beam sweeping procedure 1200, with the assistance information from the WTRU 1204, the WTRU may be configured with an appropriate amount of DL RS resources (e.g., in DCI trigger 1206 triggering aperiodic DL RS) for the WTRU 1204 to sweep its RX beams on antenna panels 1231 and 1232. The WTRU 1204 and the TRP 1201 may perform joint beam sweeping across multiple WTRU panels 1231 and 1232 and TRP panels 1241 and 1242 (for example, during fixed DL TX beam 1208). In an example not shown, the WTRU 1204 and TRP 1201 may perform sequential/separate beam sweeping across multiple WTRU panels 1231 and 1232 and TRP panels 1241 and 1242.

To support Tx beam grouping, a TRP may configure multiple resource settings to a WTRU. In each resource setting, multiple CSI-RS resources may be configured and each CSI-RS resource may correspond to one Tx beamformer. Each resource setting may correspond to one Tx beam group. For example, there may be two resource settings configured to a WTRU. The two resource settings may be linked to one reporting setting. The CSI reporting setting may configure the WTRU to measure CSI-RS resources in both resource settings and report one or more CSI-RS resource indices for both resource settings. In an example, the two resource settings may be linked to two or even more reporting settings. Each reporting setting may be aperiodic, semi-persistent or periodic.

In an example, each CSI-RS resource may contain more than one antenna port. In this case, multiple antenna ports of a CSI-RS resource may correspond to one TX beam or multiple TX beams. If a CS-RS resource with multiple antenna ports may represent multiple TX beams, TX beam grouping may be supported. For example, one subset of antenna ports of multiple CSI-RS resources may represent one TX beam group, which may be transmitted from one antenna panel of a TRP, and another subset of antenna ports of the same multiple CSI-RS resource may represent another TX beam group, which may be transmitted from another antenna panel of the same TRP.

A TRP may configure the resource settings to a WTRU by synchronization signal blocks (SSBs). The SS blocks may be grouped similarly so that one set or one group of SS blocks are transmitted from one TRP panel, and another set or group of SS blocks are transmitted from another TRP panel. For a multi-panel WTRU, there may be multiple links between the WTRU and one TRP, or between the WTRU and multiple TRPs. In the case of multiple TRPs, the measurement and reporting configuration may be configured independently for each connected TRP. In this case, the configuration of each TRP may contain a high layer parameter to differentiate different TRPs, For example, an identification index may be included in the configuration IE.

For a multi-panel WTRU, there may be multiple links between the WTRU and one TRP, or between the WTRU and multiple TRPs. In the case of multiple TRPs, the measurement and reporting configuration may be jointly configured for all connected TRPs. In this case, a list of involved TRPs may be dynamically signaled and configured to differentiate the beams from different TRPs while the WTRU performs independent or joint beam measurement and reporting.

Procedures are described herein for beam measurement and reporting. In an example, a WTRU may be configured with one or more resource settings and/or one or more reporting settings. The WTRU may then perform the beam measurement and reporting. WTRU beam measurement may be periodic, semi-persistent or aperiodic. Based on certain defined rules, a WTRU may decide to report the measurement results after condition evaluations. When a multi-panel WTRU performs beam measurements, the WTRU may perform different types of beam sweeping based on the number of TRPs, TRP panels and WTRU panels that are involved in the measurement process. For example, joint beam sweeping or independent beam sweeping may be performed. In another example, same WTRU panel beam sweeping or across WTRU panels beam sweeping may be performed. In another example, same BWP beam sweeping or across BWPs beam sweeping may be performed. In another example, partial (selected) TRP-level beam sweeping or global TRP-level beam sweeping may be performed. In an example case for a WTRU to perform beam measurement reporting may be that CSI-RS resources are measured and reported in an aperiodic fashion to refine coarse beams identified through SS block measurements (e.g., periodically), thus avoiding configuring CSI-RS to sweep the entire coverage area for multiple TRPs or/and multiple TRP panels.

In order to reduce the overhead (e.g., transmission overhead at the TRP/gNB and/or measurement overhead at the WTRU) and latency (e.g., number of swept beams at both the TRP and the WTRU), the different types of beam sweeping may be flexibly and dynamically used according to different application scenarios and radio environment.

Figures 13A, 13B:
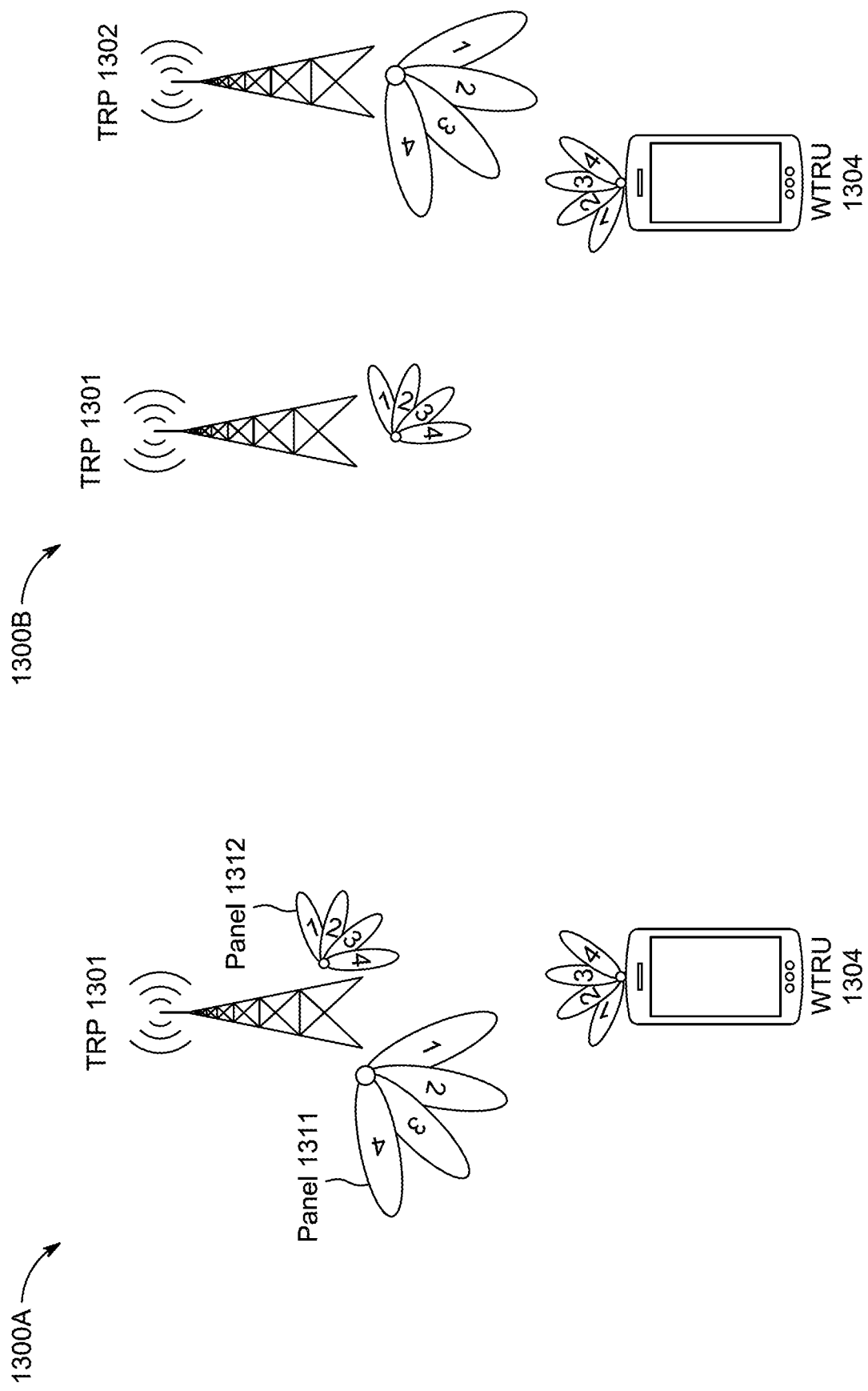
FIG. 13A shows a network diagram of an example network configuration where different transmission power is used from different TRP panels.
FIG. 13B shows a network diagram of an example network configuration where different transmission power is used from different TRPs.

In order to achieve goals such as interference avoidance between different TRPs or between different antenna panels and/or flexible cell/TRP coverage, the transmission power of the same or different DL reference signals (e.g., SSB, CSI-RS) from the same or different TRPs, or different panels of the same TRPs, may be dynamically changed. FIGS. 13A and 13B show example network configurations 1300A and 1300B where multi-resolution and multi-reference based differential beam reporting procedure may be used beneficially. FIG. 13A shows a network diagram of an example network configuration 1300A including a WTRU 1304 and TRP 1301 where different transmission power is used from TRP 1301 panels 1311 and 1312 and FIG. 13B shows a network diagram of an example network configuration 1300B where different transmission power is used from TRP 1301 and TRP 1302. In these types of cases, the measured beam quality at a WTRU may have different ranges, for example, joint or independent measurement reporting for CSI-RS and SSB. To support differential beam reporting, multi-reference and/or multi-resolution based beam reporting may be used.

Figures 14A, 14B:
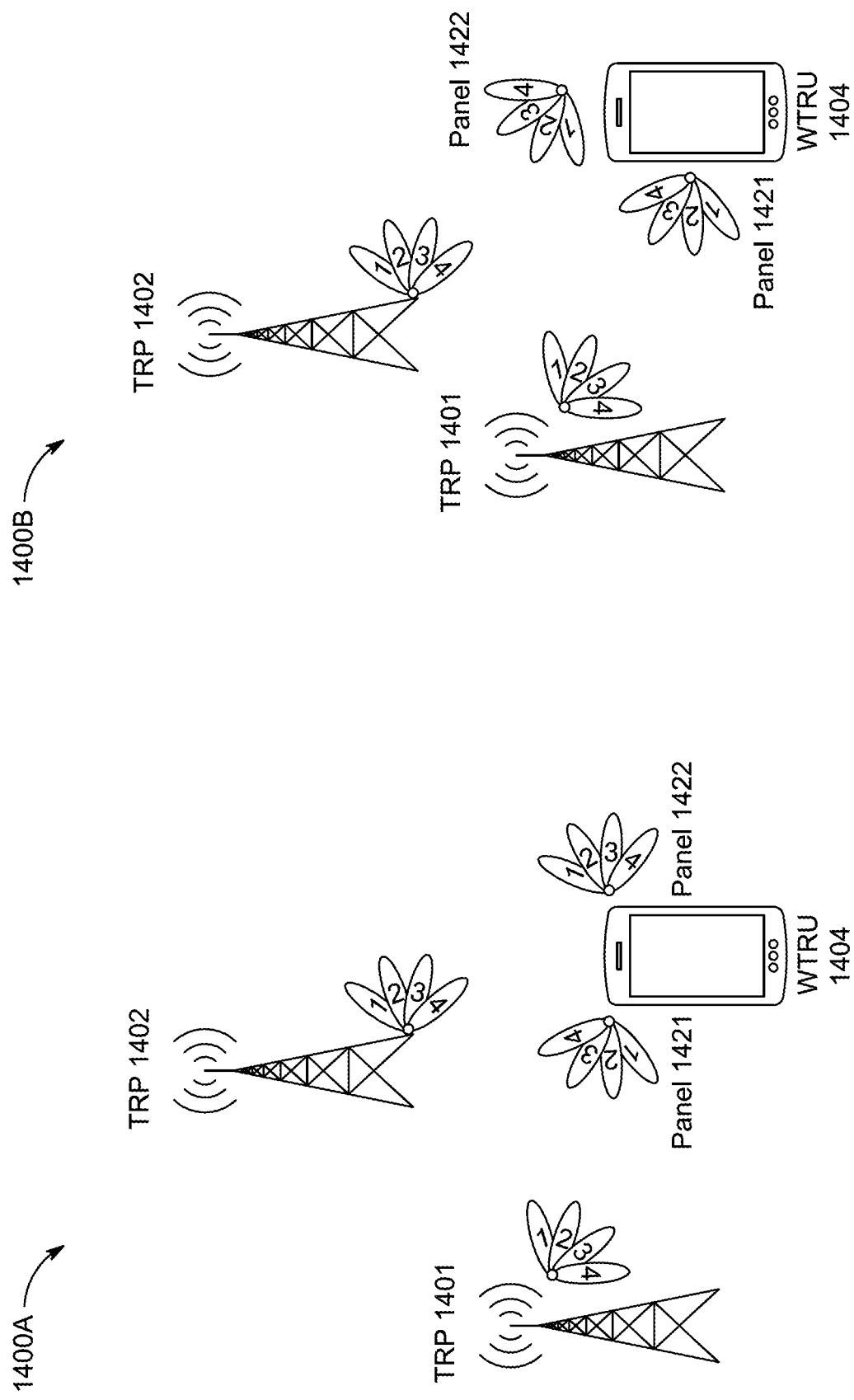
FIG. 14A shows a network diagram of an example network configuration where multiple DL TX beams at TRPs correspond to the same DL RX beams at the WTRU.

For group based beam reporting, the reported beams within each group represent the beams that may be received by a WTRU simultaneously. Within each group, the beam reporting may consider the following example scenarios. For a DPS transmission scenario (e.g., only one TRP and/or only one TRP panel is transmitting at a time), the WTRU may measure the TX beams and may report the best beam (e.g., in terms of measured quality such as received signal strength indicator (RSSI), RSRP, SINR and/or RSRQ) for each TRP panel or each TRP independently. For a non-coherent joint-transmission scenario (e.g., more than one TRPs and/or more than one TRP panels are transmitting at a time), a WTRU may report the selected beams by considering the reported beam from each TRP or TRP panel is the best with respect to the same RX beam at the WTRU. In this case, the reported beams within each group may correspond to the best beams in terms of best quality for a common RX beam (as in the example FIG. 14A). For a non-coherent joint-transmission scenario, the WTRU may report the selected beams by considering the reported beam from each TRP or TRP panel is the 'best' with respect to a different DL RX beam at the WTRU (as in the example FIG. 14B). In this case, the reported beams within each group may be selected such that interference is minimized. For example, the TX beams may be selected such that the corresponding RX beams at the WTRU are separated as much as possible. FIG. 14A shows a network diagram of an example network configuration 1400A where multiple DL TX beams at TRPs 1401 and/or 1402 correspond to the same DL RX beams at the WTRU 1404. In the example network configuration 1400A, DL TX beam 1 on TRP 1401 and DL TX beam 4 on TRP 1402 may correspond to the same DL RX beam 3 of antenna panel 1421 at the WTRU 1404. FIG. 14B shows a network diagram of an example network configuration 1400B where multiple DL TX beams at a TRPs 1401 and/or 1402 correspond to different DL RX beams at the WTRU 1404. In the example network configuration 1400B, DL TX beam 2 on TRP 1401 may correspond to DL RX beam 2 of antenna panel 1421 at the WTRU 1404 and DL TX beam 2 on TRP 1402 may correspond to DL RX beam 2 of antenna panel 1422 at the WTRU 1404.

In another example, the WTRU may report best beams independently for each TX beam group configured in CSI-RS and/or SSB for beam management. In another example, the WTRU may report best beams jointly for all the TX beam groups configured in CSI-RS or/and SSB for beam management. For non-group based beam reporting, the reported beams may be selected similar to the case in group based beam reporting.

For reduced latency and overhead, DL beam indication for PDSCH and/or PDCCH reception from multiple TRPs and/or multiple TRP/WTRU panels may be achieved jointly or independently. In an example, an extension of TCI state may be used such that each TCI state may be extended to support beam indication across multiple TRPs, multiple panels or/and multiple BWPs. Different CORESETs may be associated with the same or different TCI states. To support dynamic beam switching (e.g., intra-panel, inter-panel, intra-TRP and/or inter-TRP switching) a CORESET may be associated with multiple TCI states or the same TCI state with multiple RS set.

Although the features and elements described in the preferred embodiments may be described in reference to one or more particular combinations, each feature or element can be used alone without the other features and elements of the preferred embodiments or in various combinations with or without other features and elements. Although the solutions described herein consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A multi-panel wireless transmit and/or receive unit (WTRU) comprising:
a transceiver;
a processor; and
a plurality of antenna panels, each antenna panel comprising a respective plurality of antennas, wherein
the transceiver, the processor and the plurality of antenna panels are configured to:
send, to a transmission reception point (TRP), antenna panel capability information for the plurality of antenna panels;
receive, from the TRP, a reference signal (RS) configuration for configuring RS resource sets, wherein the RS configuration includes time and frequency location information of the configured RS resource sets;
receive, from the TRP, a first message including an indication of RS resource sets from the configured RS resource sets and an indication of antenna panel identities (IDs) or beam IDs associated with the plurality of antenna panels; and
send, using a set of antenna panels from the plurality of antenna panels, reference signals using the indicated RS resource sets, wherein the set of antenna panels is determined based on the received RS configuration and the received first message.

2. The WTRU of claim 1, wherein the plurality of antenna panels are homogeneous with similar transmit beam capabilities or heterogeneous with different transmit beam capabilities.

3. The WTRU of claim 2, wherein the transmit beam capabilities include at least one of the following: a number of supported beams or a magnitude of directional coverage.

4. The WTRU of claim 1, wherein the antenna panel capability information for the plurality of antenna panels includes at least one of the following: a number of WTRU antenna panels; antenna panel identifiers (IDs); or a number of supported beams for each antenna panel.

5. The WTRU of claim 1, wherein the RS configuration further indicates antenna panel IDs or directional beam IDs associated with the configured RS resource sets.

6. The WTRU of claim 1, wherein the indicated antenna panel IDs or beam IDs override previously signaled antenna panel IDs or beam IDS associated with the plurality of antenna panels.

7. The WTRU of claim 1, wherein the transceiver, the processor, and the plurality of antenna panels are further configured to:
receive, from the TRP, a second message including an indication of RS resources for multi-panel uplink (UL) physical uplink shared channel (PUSCH) transmission using multiple antenna panels from the plurality of antenna panels.

8. The WTRU of claim 1, wherein the RS is a sounding reference signal (SRS).

9. The WTRU of claim 1, wherein the transceiver, the processor, and the plurality of antenna panels are further configured to:
determine an uplink transmission beam sweeping mode based on the at least one of the RS configuration of the first message, wherein the determined uplink transmission beam sweeping mode is one of a sequential uplink transmission beam sweeping mode and a simultaneous uplink transmission beam sweeping mode.

10. A method, performed by a multi-panel wireless transmit and/or receive unit (WTRU) comprising a plurality of antenna panels, the method comprising:
sending, to a transmission reception point (TRP), antenna panel capability information for the plurality of antenna panels;
receiving, from the TRP, a reference signal (RS) configuration for configuring RS resource sets, wherein the RS configuration includes time and frequency location information of the configured RS resource sets;
receiving, from the TRP, a first message including an indication of RS resource sets from the configured RS resource sets and an indication of antenna panel identities (IDs) or beam IDs associated with the plurality of antenna panels; and
sending, using a set of antenna panels from the plurality of antenna panels, reference signals using the indicated RS resource sets, wherein the set of antenna panels is determined based on the received RS configuration and the received first message.

11. The method of claim 10, wherein the plurality of antenna panels are homogeneous with similar transmit beam capabilities or heterogeneous with different transmit beam capabilities.

12. The method of claim 10, wherein the antenna panel capability information for the plurality of antenna panels includes at least one of the following: a number of WTRU antenna panels; antenna panel identifiers (IDs); or a number of supported beams for each antenna panel.

13. The method of claim 10, wherein the RS configuration further indicates antenna panel IDs or directional beam IDs associated with the configured RS resource sets.

14. The method of claim 10, wherein indicated antenna panel IDs or beam IDs override previously signaled antenna panel IDs or beam IDS associated with the plurality of antenna panels.

15. The method of claim 10, further comprising:
receiving, from the TRP, a second message including an indication of RS resources for multi-panel uplink (UL) physical uplink shared channel (PUSCH) transmission using multiple antenna panels from the plurality of antenna panels.

16. The method of claim 10, wherein the RS is a sounding reference signal (SRS).

17. The method of claim 10, further comprising:
determining an uplink transmission beam sweeping mode based on at least one of the RS configuration or the first message, wherein the determined uplink transmission beam sweeping mode is one of a sequential uplink transmission beam sweeping mode and a simultaneous uplink transmission beam sweeping mode.

* * * * *